(12) United States Patent
Beaston et al.

(10) Patent No.: US 9,923,247 B2
(45) Date of Patent: Mar. 20, 2018

(54) BATTERY PACK WITH INTEGRATED BATTERY MANAGEMENT SYSTEM

(71) Applicant: Powin Energy Corporation, Tualatin, OR (US)

(72) Inventors: Virgil Lee Beaston, Tualatin, OR (US); Patrick Joseph Nystrom, Corbett, OR (US); Patten Atwood Emmons, King City, OR (US)

(73) Assignee: Powin Energy Corporation, Tualatin, OR (US)

( * ) Notice: Subject to any disclaimer, the term of this patent is extended or adjusted under 35 U.S.C. 154(b) by 154 days.

(21) Appl. No.: 14/851,482

(22) Filed: Sep. 11, 2015

(65) Prior Publication Data

US 2017/0077559 A1 Mar. 16, 2017

(51) Int. Cl.
*H01M 2/00* (2006.01)
*H01M 10/42* (2006.01)
*H01M 10/0525* (2010.01)

(52) U.S. Cl.
CPC ... *H01M 10/4257* (2013.01); *H01M 10/4207* (2013.01); *H01M 10/0525* (2013.01); *H01M 2010/4271* (2013.01)

(58) Field of Classification Search
CPC ......... H01M 10/4257; H01M 10/4207; H01M 10/0525; H01M 2010/4271
See application file for complete search history.

(56) References Cited

U.S. PATENT DOCUMENTS

| | | | |
|---|---|---|---|
| 5,825,155 A | 10/1998 | Ito et al. | |
| 5,952,815 A | 9/1999 | Rouillard et al. | |
| 6,060,864 A | 5/2000 | Ito et al. | |
| 6,172,481 B1 | 1/2001 | Curtiss | |
| 7,497,285 B1 | 3/2009 | Radev | |
| 7,583,053 B2 | 9/2009 | Kamohara | |
| 8,111,035 B2 | 2/2012 | Rosenstock | |
| 9,168,836 B2 | 10/2015 | Jacobsen | |
| 9,331,497 B2 | 5/2016 | Beaston | |
| 9,647,463 B2 | 5/2017 | Brandl et al. | |
| 2004/0130292 A1 | 7/2004 | Buchanan et al. | |

(Continued)

FOREIGN PATENT DOCUMENTS

| | | |
|---|---|---|
| CN | 1367565 A | 9/2002 |
| CN | 2648617 Y | 10/2004 |

(Continued)

OTHER PUBLICATIONS

Non-Final Office Action dated Dec. 29, 2016 in U.S. Appl. No. 14/678,074, filed Apr. 3, 2015, 16 pages.

(Continued)

*Primary Examiner* — Raymond Alejandro
(74) *Attorney, Agent, or Firm* — Sterne, Kessler, Goldstein & Fox P.L.L.C.

(57) ABSTRACT

Embodiments disclosed herein relate to a battery pack that may be used in an battery energy storage system. In an embodiment, the battery pack may include an integrated battery management system (BMS) having isolated, distributed, daisy-chained battery module controllers. The daisy-chained battery module controllers may be coupled to a battery pack controller, which may charge and/or discharge the battery pack using the battery modules controllers and a balancing charger.

19 Claims, 22 Drawing Sheets

(56) References Cited

U.S. PATENT DOCUMENTS

| | | |
|---|---|---|
| 2004/0189248 A1 | 9/2004 | Boskovitch et al. |
| 2005/0024016 A1 | 2/2005 | Breen et al. |
| 2005/0230976 A1 | 10/2005 | Yang |
| 2006/0097698 A1 | 5/2006 | Plett |
| 2006/0116797 A1 | 6/2006 | Moran |
| 2007/0124037 A1 | 5/2007 | Moran |
| 2007/0191180 A1 | 8/2007 | Yang |
| 2008/0093851 A1 | 4/2008 | Maeda et al. |
| 2008/0211459 A1 | 9/2008 | Choi |
| 2008/0238356 A1 | 10/2008 | Batson et al. |
| 2008/0309288 A1 | 12/2008 | Benckenstein et al. |
| 2009/0015206 A1 | 1/2009 | Seman, Jr. et al. |
| 2009/0167247 A1 | 7/2009 | Bai et al. |
| 2009/0222158 A1 | 9/2009 | Kubota et al. |
| 2009/0243540 A1 | 10/2009 | Choi et al. |
| 2010/0145562 A1 | 6/2010 | Moran |
| 2010/0237829 A1 | 9/2010 | Tatebayashi et al. |
| 2010/0248008 A1 | 9/2010 | Sugawara et al. |
| 2011/0014501 A1 | 1/2011 | Scheucher |
| 2011/0133920 A1 | 6/2011 | Meadors |
| 2011/0137502 A1 | 6/2011 | Kato et al. |
| 2011/0231049 A1 | 9/2011 | Le Brusq et al. |
| 2011/0244283 A1 | 10/2011 | Seto et al. |
| 2011/0313613 A1 | 12/2011 | Kawahara et al. |
| 2012/0046892 A1 | 2/2012 | Fink |
| 2012/0062187 A1 | 3/2012 | Shim |
| 2012/0068715 A1 | 3/2012 | Martaeng |
| 2012/0074911 A1 | 3/2012 | Murao |
| 2012/0089352 A1 | 4/2012 | Librizzi |
| 2012/0105001 A1 | 5/2012 | Gallegos et al. |
| 2012/0303225 A1 | 11/2012 | Futahashi et al. |
| 2013/0002197 A1 | 1/2013 | Hernandez et al. |
| 2013/0002203 A1 | 1/2013 | Kuraishi |
| 2013/0106356 A1 | 5/2013 | Nakao et al. |
| 2013/0135110 A1* | 5/2013 | Xie ................... G08B 29/181 340/636.11 |
| 2013/0328530 A1 | 12/2013 | Beaston |
| 2013/0337299 A1 | 12/2013 | Sugawara |
| 2014/0015469 A1 | 1/2014 | Beaston et al. |
| 2014/0015488 A1 | 1/2014 | Despesse |
| 2014/0042973 A1 | 2/2014 | Kawahara et al. |
| 2014/0079963 A1 | 3/2014 | Takeuchi |
| 2014/0220396 A1 | 8/2014 | Lee et al. |
| 2014/0225622 A1 | 8/2014 | Kudo et al. |
| 2015/0104673 A1 | 4/2015 | de Greef et al. |
| 2015/0202973 A1 | 7/2015 | Chang |
| 2015/0349569 A1 | 12/2015 | Christensen et al. |
| 2016/0111900 A1 | 4/2016 | Beaston et al. |
| 2016/0141894 A1 | 5/2016 | Beaston |
| 2017/0038433 A1 | 2/2017 | Beaston et al. |
| 2017/0040646 A1 | 2/2017 | Beaston |
| 2017/0077558 A1 | 3/2017 | Nystrom et al. |
| 2017/0106764 A1 | 4/2017 | Beaston et al. |
| 2017/0126032 A1 | 5/2017 | Beaston |

FOREIGN PATENT DOCUMENTS

| | | |
|---|---|---|
| CN | 2796215 Y | 7/2006 |
| CN | 1819395 A | 8/2006 |
| CN | 1011992755 A | 6/2008 |
| CN | 101222150 A | 7/2008 |
| CN | 102570568 A | 7/2012 |
| CN | 102882263 A | 1/2013 |
| CN | 202663154 U | 1/2013 |
| CN | 103119828 A | 5/2013 |
| CN | 103253143 A | 8/2013 |
| CN | 103812150 A | 5/2014 |
| WO | WO 2012/110497 A1 | 8/2012 |

OTHER PUBLICATIONS

U.S. Appl. No. 15/389,188, "Battery Pack Monitoring and Warranty System," to Beaston et al., filed Dec. 22, 2016.

U.S. Appl. No. 15/604,329, "World-Wide Web of Networked, Smart, Scalable, Plug & Play Battery Packs Having a Battery Pack Operating System, and Applications Thereof," to Beaston, filed May 24, 2017.

https://www.merriam-webster.com/dictionary/daisy%20chain.

Chris Bakken and Ives Meadors, applicants; U.S. Appl. No. 61/313,548; publicly available as of Jun. 9, 2011 (filed Mar. 12, 2010); 14 pages including filing receipt, provisional cover sheet, and EFS receipt.

English language abstract of Chinese Patent Publication No. CN 101222150 A, published Jul. 16, 2008, 1 page, retrieved from https://worldwide.espacenet.com.

English language abstract of Chinese Patent Publication No. CN 102570568 A, published Jul. 11, 2012, 1 page, retrieved from https://worldwide.espacenet.com.

English language abstract of Chinese Patent Publication No. CN 102882263 A, published Jan. 16, 2013, 1 page, retrieved from https://worldwide.espacenet.com.

English language abstract of Chinese Patent Publication No. CN 103253143 A, published Aug. 21, 2013, 1 page, retrieved from https://worldwide.espacenet.com.

English language abstract of Chinese Patent Publication No. CN 202663154 U, published Jan. 9, 2013, 1 page, retrieved from https://worldwide.espacenet.com.

Non-Final Office Action dated Nov. 23, 2015, in U.S. Appl. No. 13/978,689, filed Aug. 27, 2013; 11 pages.

U.S. Appl. No. 14/932,688, "Battery Energy Storage System," to Beaston, filed Nov. 4, 2015.

Non-Final Office Action dated May 12, 2015, in U.S. Appl. No. 13/978,689, filed Aug. 27, 2013; 12 pages.

Final Office Action dated Sep. 21, 2015, in U.S. Appl. No. 13/978,689, filed Aug. 27, 2013; 12 pages.

International Preliminary Report on Patentability, dated Sep. 10, 2013, in International Patent Application No. PCT/CN2011/071548; 5 pages.

International Search Report and Written Opinion on Patentability, dated Dec. 1, 2011, in International Patent Application No. PCT/CN2011/071548; 10 pages.

U.S. Appl. No, 14/678,074, "Electrical Energy Storage Unit and Control System and Applications Thereof," to Beaston, et al., filed Apr. 3, 2015.

U.S. Appl. No. 14/851,460, "Battery Management System (BMS) Having Isolated, Distributed, Daisy-Chained Battery Module Controllers," to Nystrom, et al., filed Sep. 11, 2015.

Notice of Allowance dated Mar. 21, 2016, in U.S. Appl. No. 13/978,689, filed Aug. 27, 2013; 8 pages.

U.S. Appl. No. 14/962,491, "Battery Energy Storage System and Control System and Applications Thereof," to Beaston, filed Dec. 8, 2015.

U.S. Appl. No. 14/819,779, "Warranty Tracker for a Battery Pack," to Beaston, filed Aug. 6, 2015.

U.S. Appl. No. 14/819,774, "Systems and Methods for Detecting a Battery Pack Having an Operating Issue or Defect," to Beaston, filed Aug. 6, 2015.

U.S. Appl. No. 14/884,463, "Battery-Assisted Electric Vehicle Charging System and Method," to Beaston et al., filed Oct. 15, 2015.

English translation for Chinese patent publication No. CN 103119828 A, published May 22, 2013, 13 pages, translated by Google Patents at https://patents.google.com.

English translation for Chinese patent publication No. CN 103812150 A, published May 21, 2014, 7 pages, translated by Google Patents at https://patents.google.com.

* cited by examiner

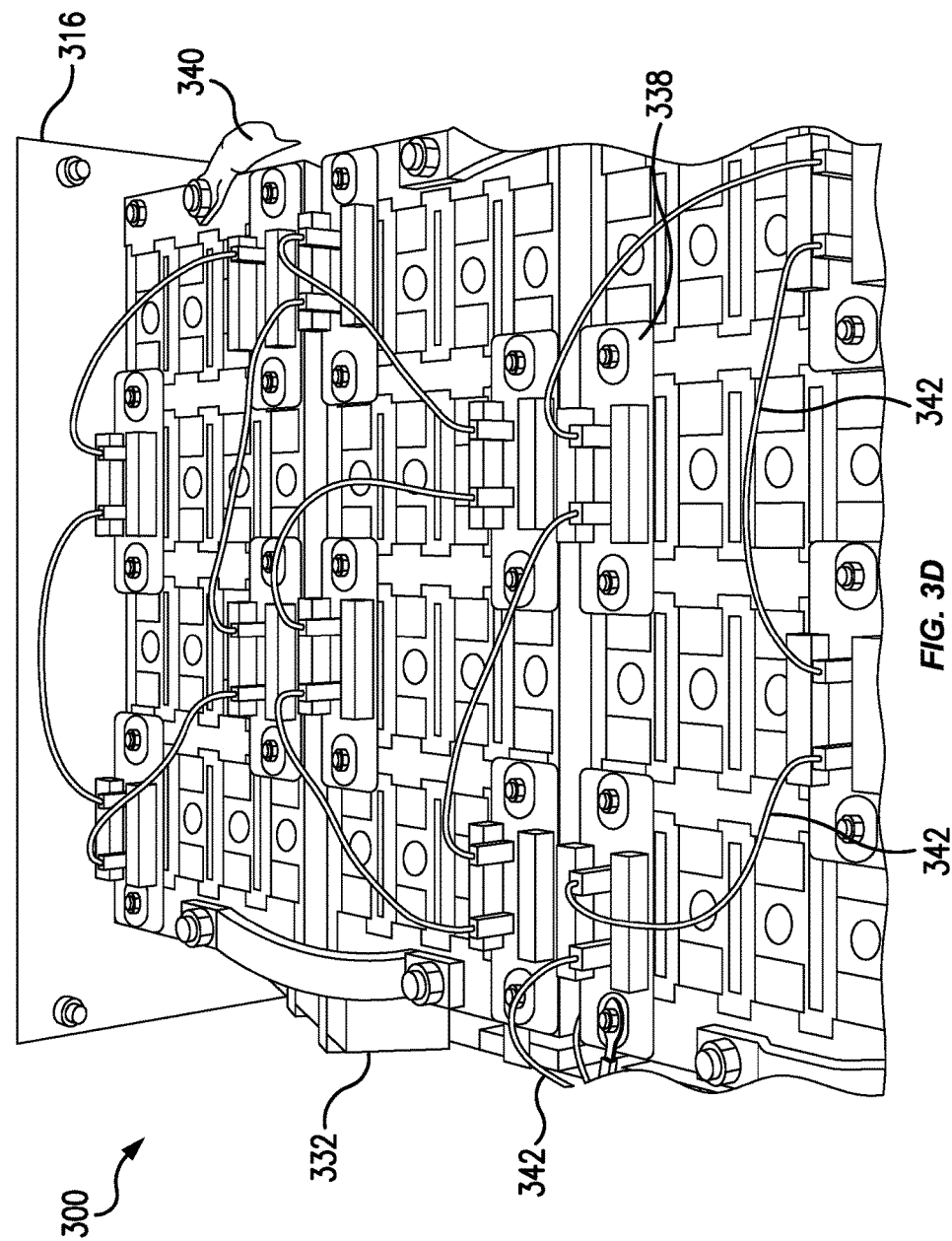

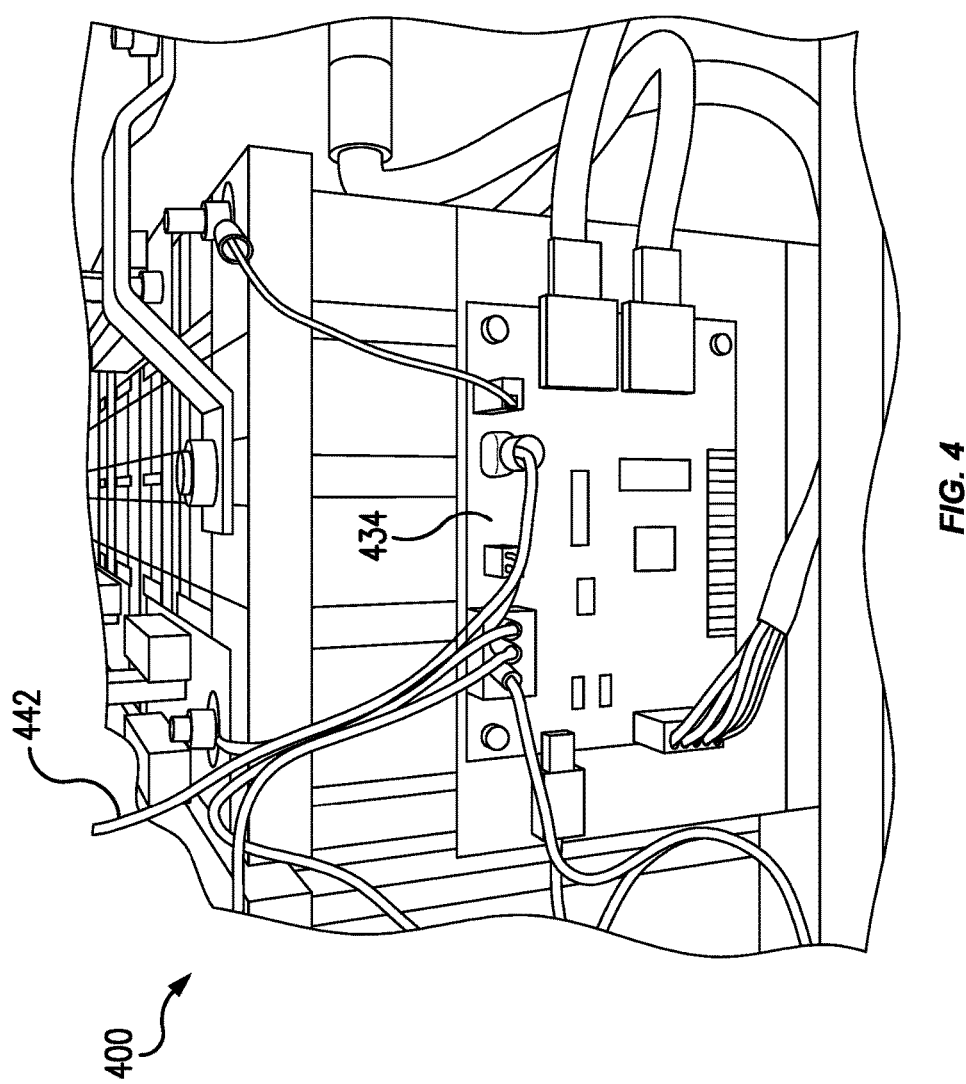

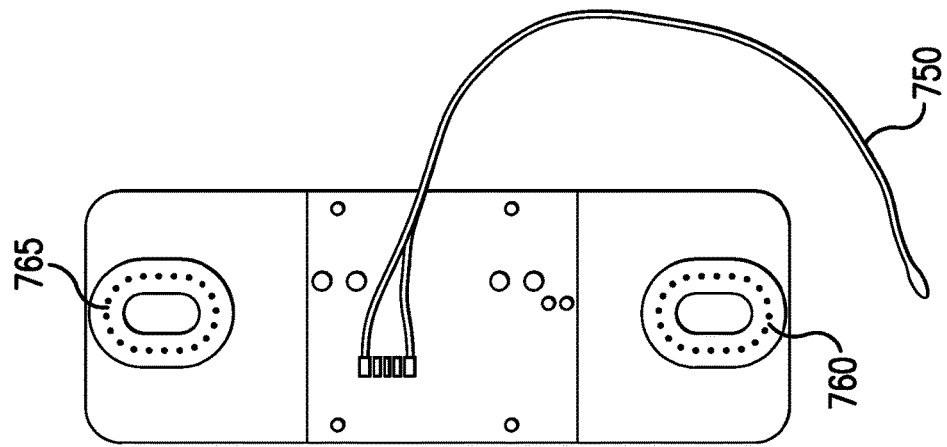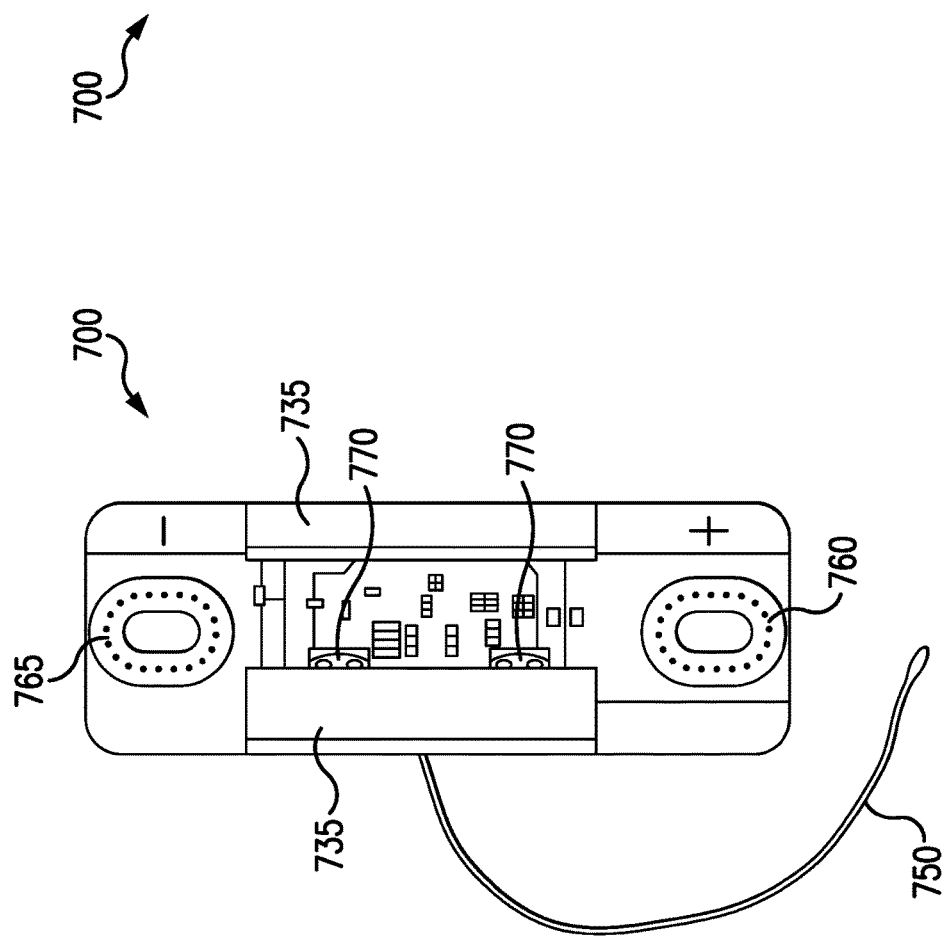

BATTERY PACK WITH INTEGRATED BATTERY MANAGEMENT SYSTEM

BACKGROUND

Field

Embodiments disclosed herein relate to a battery pack that may be used in a battery energy storage system. The battery pack may include an integrated battery management system.

Background

Electrical energy is vital to modern national economies. Increasing electrical energy demand and a trend towards increasing the use of renewable energy assets to generate electricity, however, are creating pressures on aging electrical infrastructures that have made them more vulnerable to failure, particularly during peak demand periods. In some regions, the increase in demand is such that periods of peak demand are dangerously close to exceeding the maximum supply levels that the electrical power industry can generate and transmit. New energy storage systems, methods, and apparatuses that allow electricity to be generated and used in a more cost effective and reliable manner are described herein.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art to make and use the disclosure.

FIGS. 1A, 1B, and 1C are diagrams illustrating an example battery pack.

FIGS. 2A, 2B, 2C, and 2D are diagrams further illustrating an example battery pack.

FIGS. 3A, 3B, 3C, 3D, 3E, 3F, 3G, and 3H are diagrams further illustrating an example battery pack.

FIG. 4 is a diagram illustrating an example battery pack controller integrated into a battery pack.

FIGS. 7A and 7B are diagrams illustrating an example battery module controller.

In the drawings, like reference numbers may indicate identical or functionally similar elements.

DETAILED DESCRIPTION

While the present disclosure is described herein with illustrative embodiments for particular applications, it should be understood that the disclosure is not limited thereto. A person skilled in the art with access to the teachings provided herein will recognize additional modifications, applications, and embodiments within the scope thereof and additional fields in which the disclosure would be of significant utility.

The terms "embodiments" or "example embodiments" do not require that all embodiments include the discussed feature, advantage, or mode of operation. Alternate embodiments may be devised without departing from the scope or spirit of the disclosure, and well-known elements may not be described in detail or may be omitted so as not to obscure the relevant details. In addition, the terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the terms "comprises," "comprising," "includes" and "including," when used herein, specify the presence of stated features, integers, steps, operations, elements, and components, but do not preclude the presence or addition of one or more other features, integers, steps, operations, elements, components, or groups thereof.

Figure 1A:
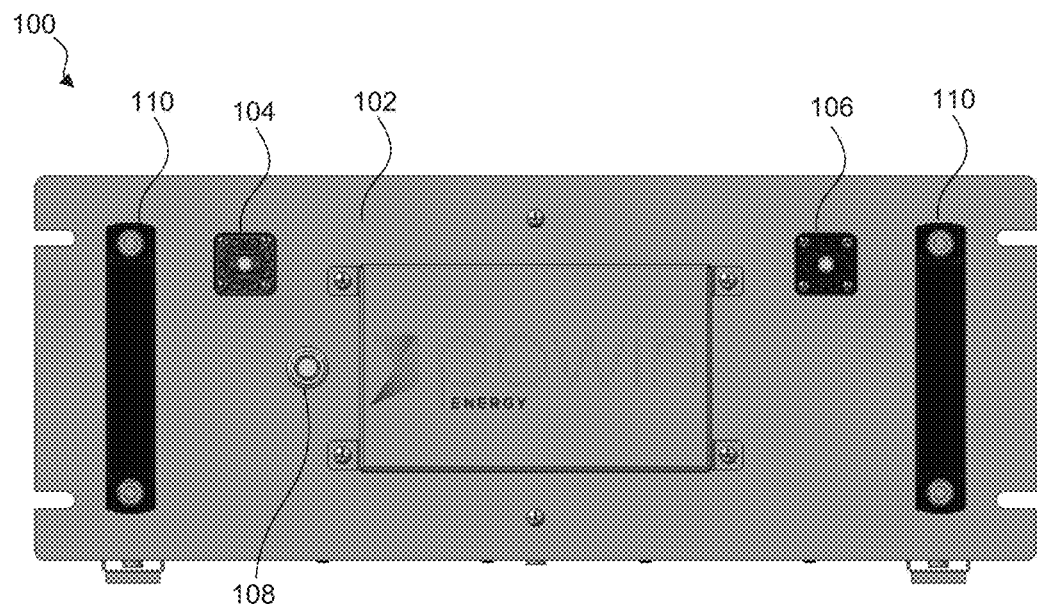
Figure 1B:
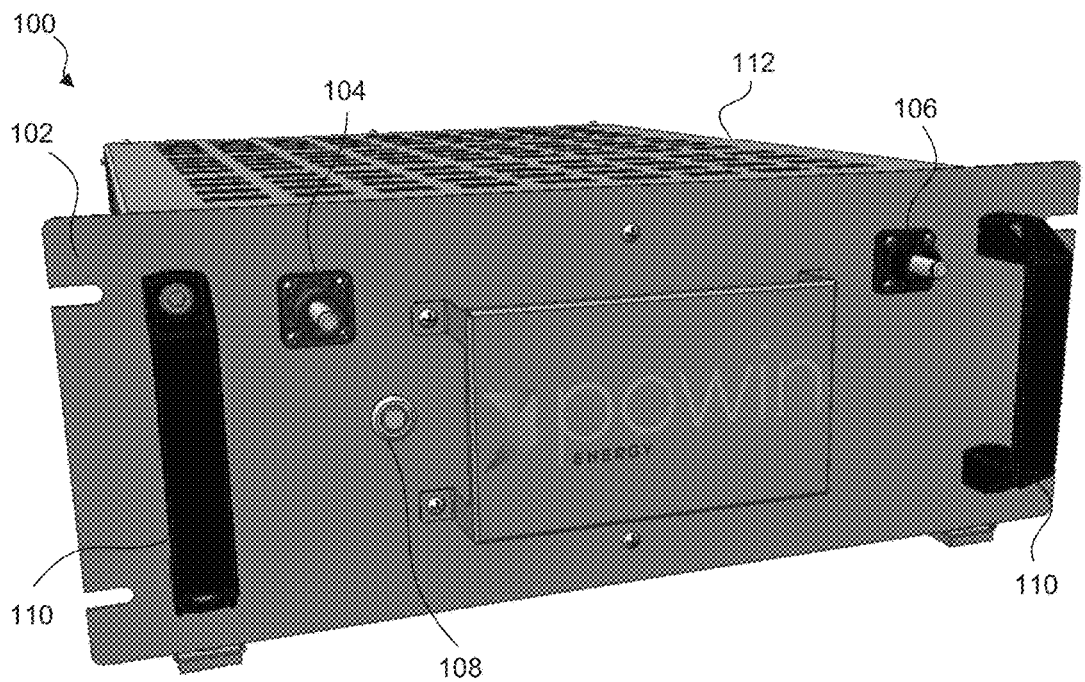
Figure 1C:
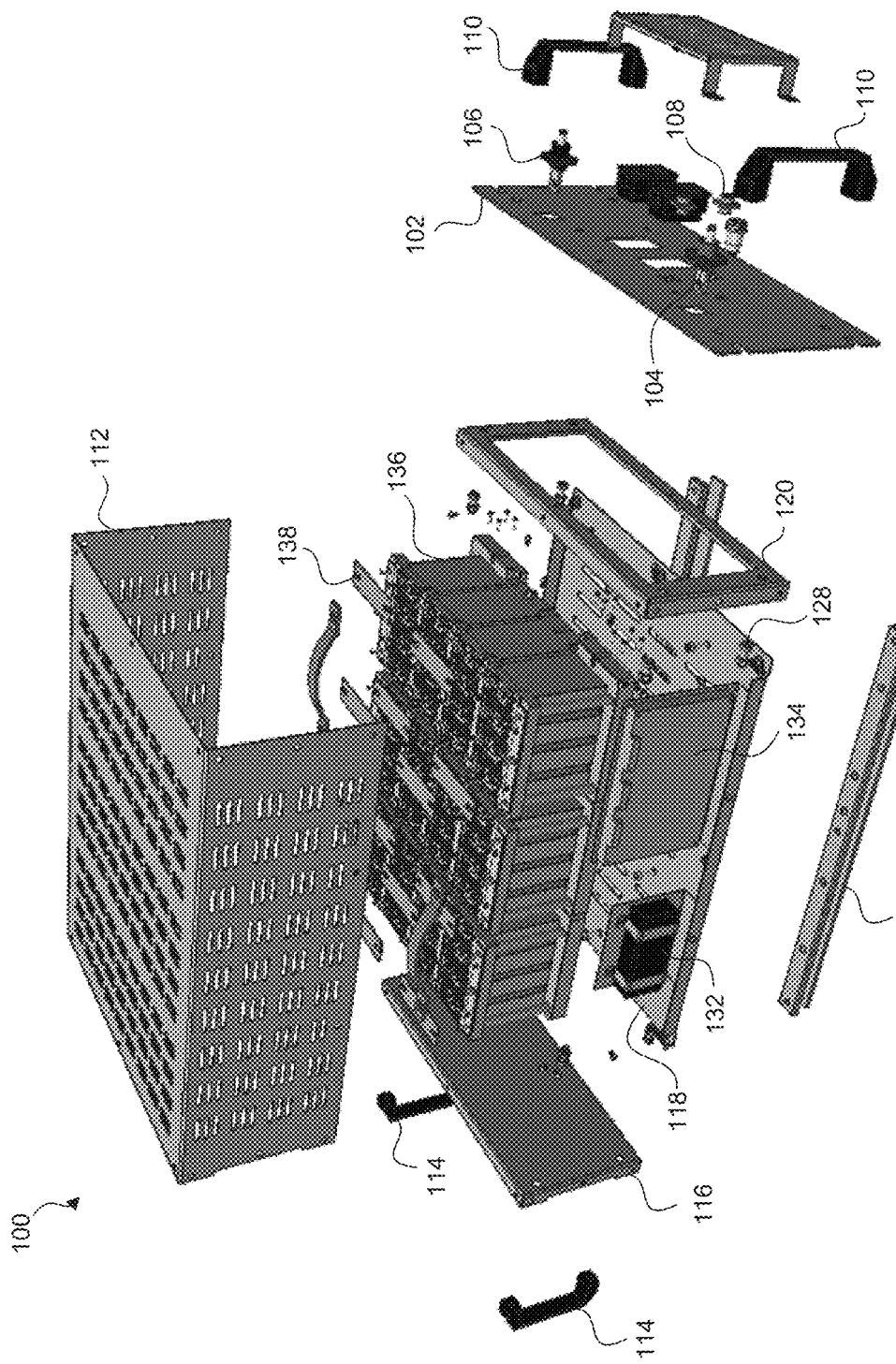

FIGS. 1A, 1B, and 1C are diagrams illustrating an example battery pack 100 according to an embodiment of the disclosure. Specifically, FIGS. 1A and 1B depict front views of battery pack 100, and FIG. 1C depicts an exploded view of battery pack 100. As shown in FIGS. 1A-C, the housing of battery pack 100 may include a front panel 102, a lid or cover 112, a back panel 116, and a bottom 118. The lid 112, which includes left and right side portions, may include a plurality of air vents to facilitate air flow through battery pack 100 and aid in cooling the internal components of battery pack 100. In a non-limiting embodiment, the lid 112 is "U"-shaped and may be fabricated from a single piece of metal, plastic, or any other material known to one of ordinary skill in the art.

The housing of battery pack 100 may be assembled using fasteners 128 shown in FIG. 1C, which may be screws and bolts or any other fastener known to one of ordinary skill in the art. The housing of battery pack 100 may also include front handles 110 and back handles 114. As shown in FIG. 1C, front plate 102 may be coupled to lid 112 and bottom 118 via front panel mount 120. In one embodiment, battery pack 100 is implemented as a rack-mountable equipment module. For example, battery pack 100 may be implemented as a standard 19-inch rack (e.g., front panel 102 having a width of 19 inches, and battery pack 100 having a depth of between 22 and 24 inches and a height of 4 rack units or "U," where U is a standard unit that is equal to 1.752 inches). As shown in FIG. 1C, battery pack 100 may include one or more mounts 122 attached to bottom 118. Mount 122 may be used to secure battery pack 100 in a rack in order to arrange a plurality of battery packs in a stacked configuration (shown in FIG. 9).

In FIGS. 1A-C, battery pack 100 includes a power connector 104 that may be connected to the negative terminal of the battery pack and a power connector 106 that may be connected to a positive terminal of the battery pack. In other embodiments, the power connector 104 may be used to connect to a positive terminal of the battery pack, and power connector 106 may be used to connect to a negative terminal of the battery pack (such as in the embodiment discussed below with respect to FIGS. 2A-D). As shown in FIGS. 1A and 1B, the power connectors 104 and 106 may be provided on the front plate or panel 102 of battery pack 100. Power cables (not shown) may be attached to the power connectors 104 and 106 and used to add or remove energy from battery pack 100.

The front panel 102 of battery pack 100 may also include a status light and reset button 108. In one embodiment, status button 108 is a push button that can be depressed to reset or restart battery pack 100. In one embodiment, the outer ring around the center of button 108 may be illuminated to indicate the operating status of battery pack 100. The illumination may be generated by a light source, such as one or more light emitting diodes, that is coupled to or part of the status button 108. In this embodiment, different color illumination may indicate different operating states of the battery pack. For example, constant or steady green light may indicate that battery pack 100 is in a normal operating state; flashing or strobing green light may indicate that battery pack 100 is in a normal operating state and that battery pack 100 is currently balancing the batteries; constant or steady yellow light may indicate a warning or that battery pack 100 is in an error state; flashing or strobing yellow light may indicate a warning or that battery pack 100 is in an error state and that battery pack 100 is currently balancing the batteries; constant or steady red light may indicate that the battery pack 100 is in an alarm state; flashing or strobing red light may indicate that battery pack 100 needs to be replaced; and no light emitted from the status light may indicate that battery pack 100 has no power and/or needs to be replaced. In some embodiments, when the status light emits red light (steady or flashing) or no light, connectors in battery pack 100 or in an external controller are automatically opened to prevent charging or discharging of the batteries. As would be apparent to one of ordinary skill in the art, any color, strobing technique, etc., of illumination to indicate the operating status of battery pack 100 is within the scope of this disclosure.

Turning to FIG. 1C, example components that are disposed inside the housing of battery pack 100 are shown, including (but not limited to) balancing charger 132, battery pack controller (BPC) 134, and battery module controller (BMC) 138. Balancing charger 132 may be a power supply, such as a DC power supply, and may provide energy to all of the battery cells in a battery pack. In an embodiment, balancing charger 132 may provide energy to all of the battery cells in the battery pack at the same time. BMC 138 is coupled to battery module 136 and may selectively discharge energy from the battery cells that are included in battery module 136, as well as take measurements (e.g., voltage and temperature) of battery module 136. BPC 134 may control balancing charger 132 and BMC 138 to balance or adjust the voltage and/or state of charge of a battery module to a target voltage and/or state of charge value.

As shown, battery pack 100 includes a plurality of battery modules and a BMC (e.g., battery module controller 138) is coupled to each battery module (e.g., battery module 136). In one embodiment, which is described in more detail below, n BMCs (where n is greater than or equal to 2) can be daisy-chained together and coupled to a BPC to form a single-wire communication network. In this example arrangement, each BMC may have a unique address and the BPC may communicate with each of the BMCs by addressing one or more messages to the unique address of any desired BMC. The one or more messages (which include the unique address of the BMC) may include an instruction, for example, to remove energy from a battery module, to stop removing energy from a battery module, to measure and report the temperature of the battery module, and to measure and report the voltage of the battery module. In one embodiment, BPC 134 may obtain measurements (e.g., temperature, voltage) from each of the BMCs using a polling technique. BPC 134 may calculate or receive (e.g., from a controller outside of battery pack 100) a target voltage for battery pack 100, and may use the balancing charger 132 and the network of BMCs to adjust each of the battery modules to the target voltage. Thus, battery pack 100 may be considered a smart battery pack, able to self-adjust its battery cells to a target voltage.

The electrical wiring that connects various components of battery pack 100 has been omitted from FIG. 1C to enhance viewability. In the illustrated embodiment, balancing charger 132 and battery pack controller 134 may be connected to or mounted on the bottom 118. While shown as mounted on the left side of battery pack 100, balancing charger 132 and battery pack controller 134, as well as all other components disposed in battery pack 100, may be disposed at any location within battery pack 100.

Battery module 136 includes a plurality of battery cells. Any number of battery cells may be included in battery module 136. Example battery cells include, but are not limited to, Li ion battery cells, such as 18650 or 26650 battery cells. The battery cells may be cylindrical battery cells, prismatic battery cells, or pouch battery cells, to name a few examples. The battery cells or battery modules may be, for example, up to 100 AH battery cells or battery modules. In some embodiments, the battery cells are connected in series/parallel configuration. Example battery cell configurations include, but are not limited to, 1P16S configuration, 2P16S configuration, 3P16S configuration, 4P16S configuration, 1P12S configuration, 2P12S configuration, 3P12S configuration, and 4P12S configuration. Other configurations known to one of ordinary skill in the art are within the scope of this disclosure. Battery module 136 includes positive and negative terminals for adding energy to and removing energy from the plurality of battery cells included therein.

As shown in FIG. 1C, battery pack 100 includes 12 battery modules that form a battery assembly. In another embodiment, battery pack 100 may include 16 battery modules that form a battery assembly. In other embodiments, battery pack 100 may include 20 battery modules or 25 battery modules that form a battery assembly. As would be apparent to one of ordinary skill in the art, any number of battery modules may be connected to form the battery assembly of battery pack 100. In battery pack 100, the battery modules that are arranged as a battery assembly may be arranged in a series configuration.

Figure 5A:
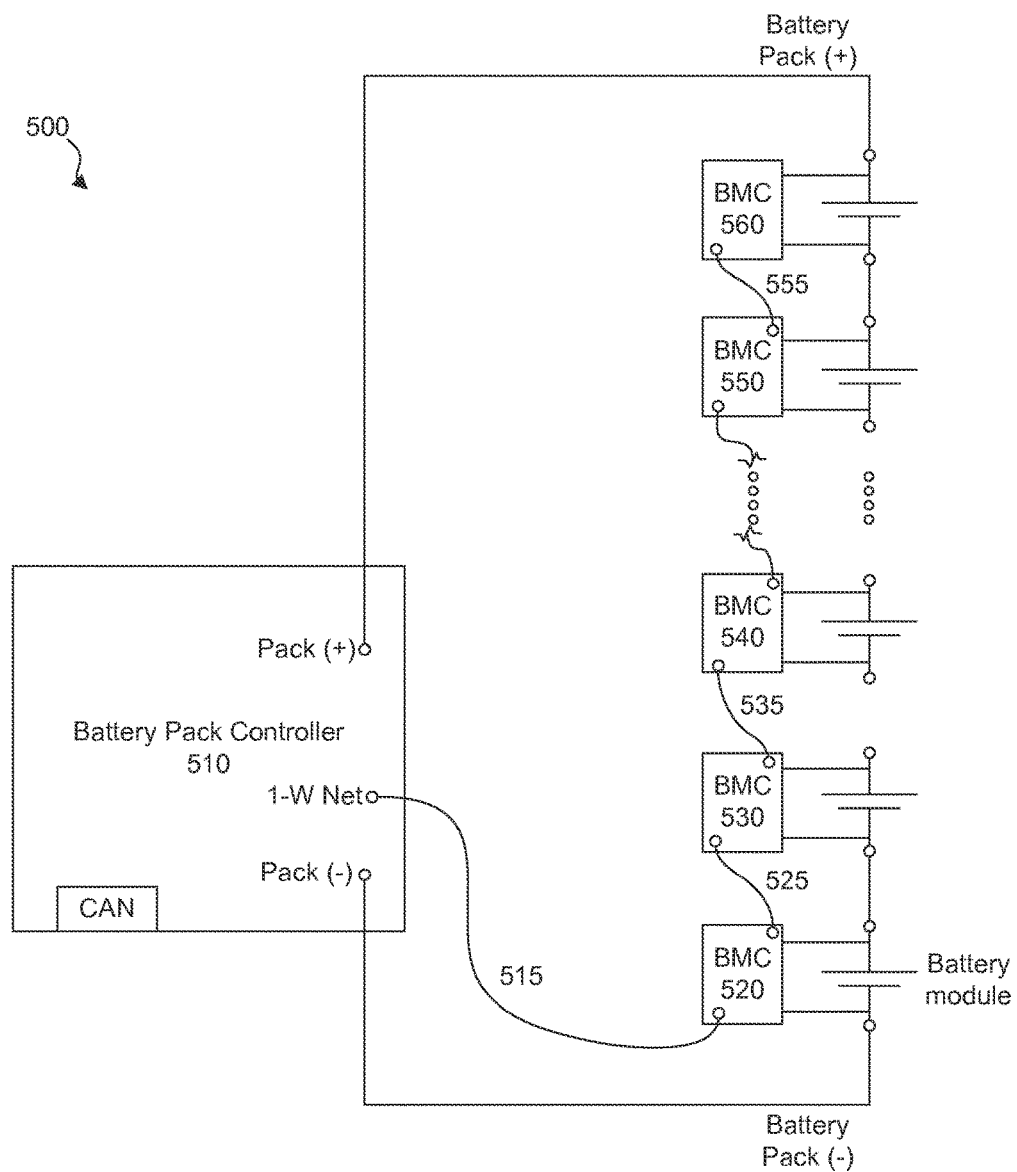
FIG. 5A is a diagram illustrating an example communication network formed by a battery pack controller and a plurality of battery module controllers.

In FIG. 1C, battery module controller 138 is coupled to battery module 136. Battery module controller 138 may be couple to the positive and negative terminals of battery module 136. Battery module controller 138 may be configured to perform one, some, or all of the following functions: remove energy from battery module 136, measure the voltage of battery module 136, and measure the temperature of battery module 136. As would be understood by one of ordinary skill in the art, battery module controller 138 is not limited to performing the functions just described. In one embodiment, battery module controller 138 is implemented as one or more circuits disposed on a printed circuit board. In battery pack 100, one battery module controller is coupled to or mounted on each of the battery modules in battery pack 100. Additionally, each battery module controller may be coupled to one or more adjacent battery module controllers via wiring to form a communication network. As illustrated in FIG. 5A, n battery module controllers (where n is a whole number greater than or equal to two) may be daisy-chained together and coupled to a battery pack controller to form a communication network.

Figure 2A:
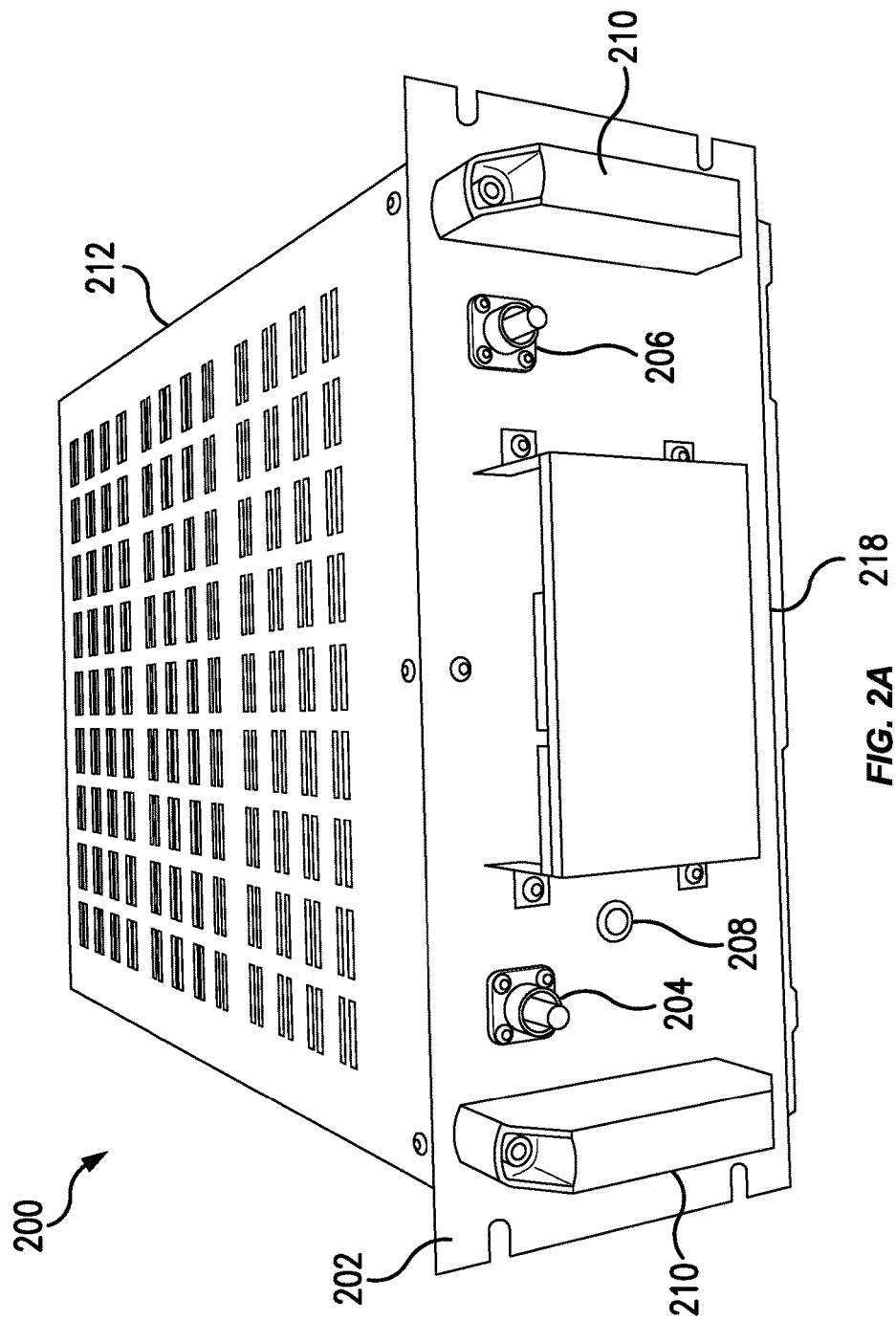
Figure 2B:
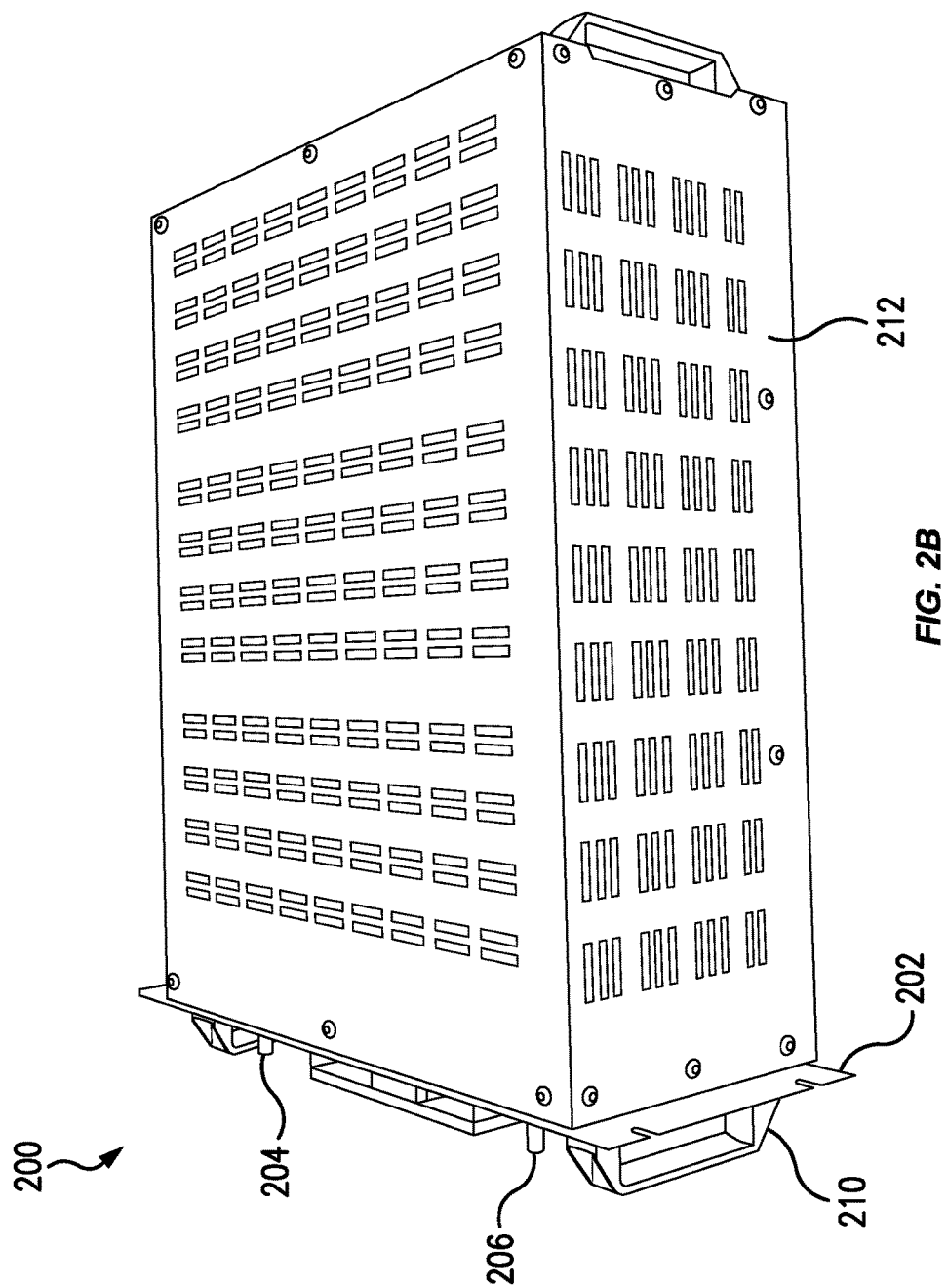
Figure 2C:
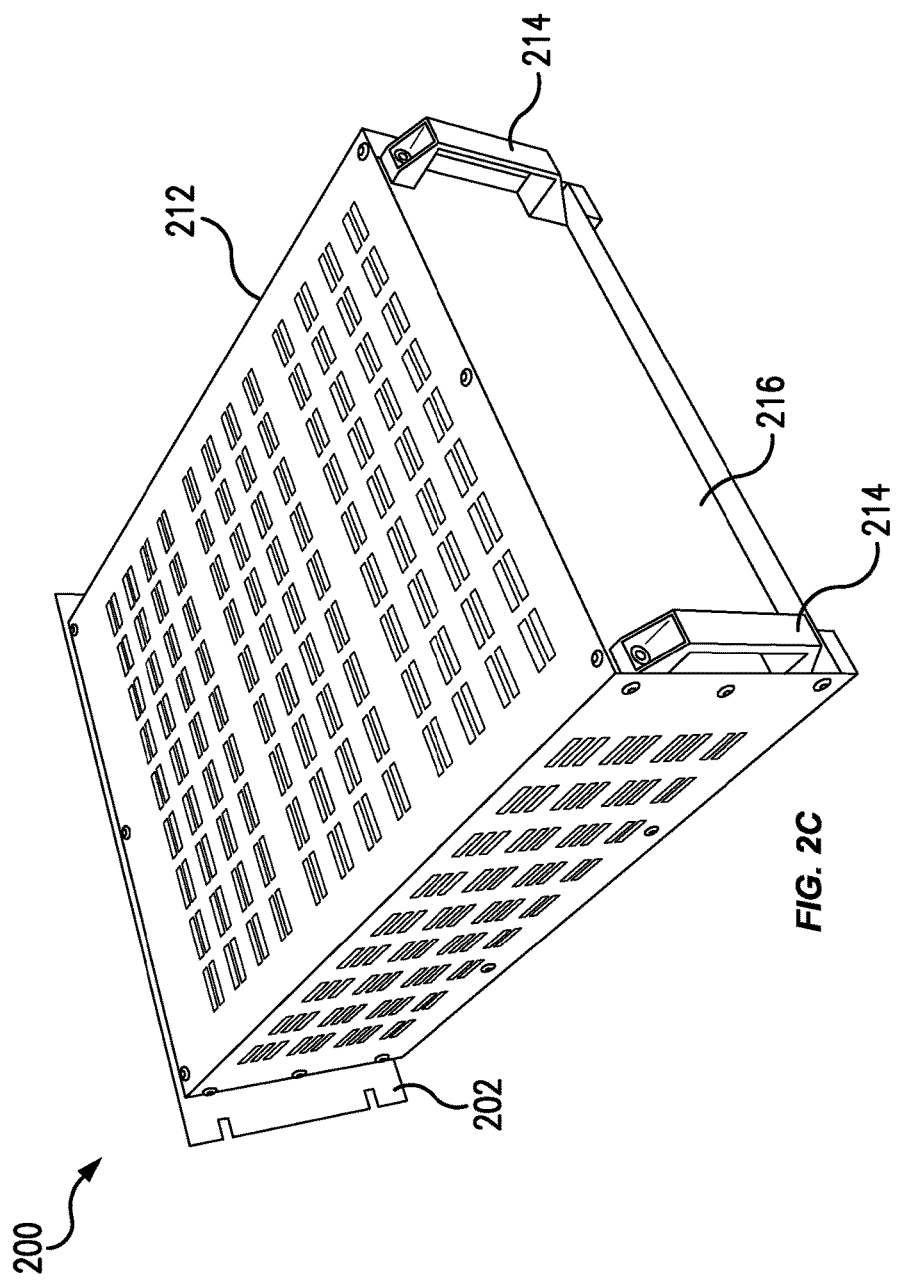
Figure 2D:
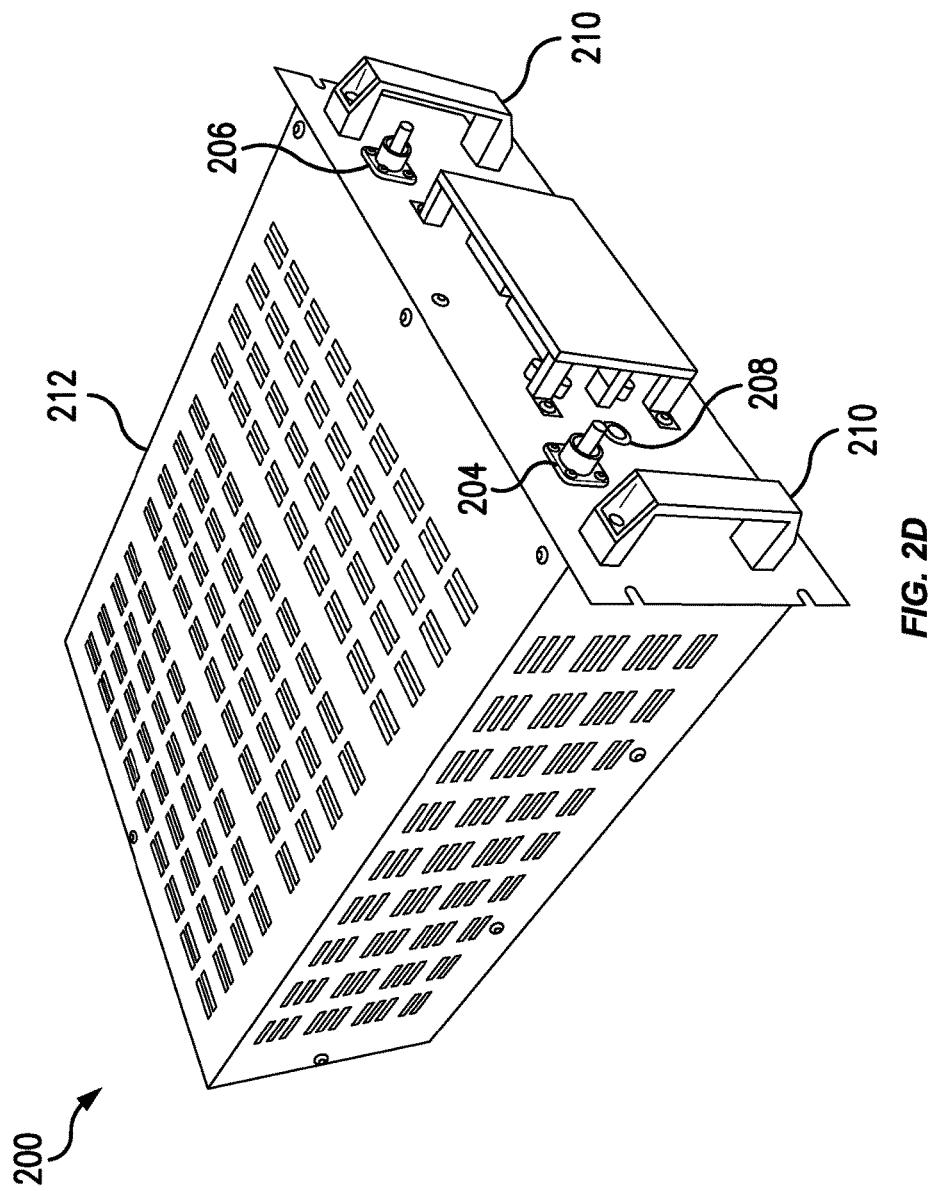

FIGS. 2A, 2B, 2C, and 2D are diagrams illustrating an example battery pack 200 according to an embodiment of the disclosure. Specifically, FIG. 2A depicts a front view of battery pack 200, FIG. 2B depicts a side view of battery pack 200, FIG. 2C depicts an angled rear view of battery pack 200, and FIG. 2D depicts an angled front view of battery pack 200. Battery pack 200 may operate in the same manner as described with respect to battery pack 100 of FIGS. 1A-C.

As described above with respect to FIGS. 1A-C, the housing of battery pack 200 may include a front panel 202, a lid or cover 212, a back panel 216, and a bottom 218. Front panel 202 may include a power connector 204 that may be connected to the positive terminal of the battery pack, power connector 206 that may be connected to the negative terminal of the battery pack, a status light and reset button 208, and front handles 210. Rear panel 216 may include back handles 214 (shown in FIG. 2C).

Figure 3A:
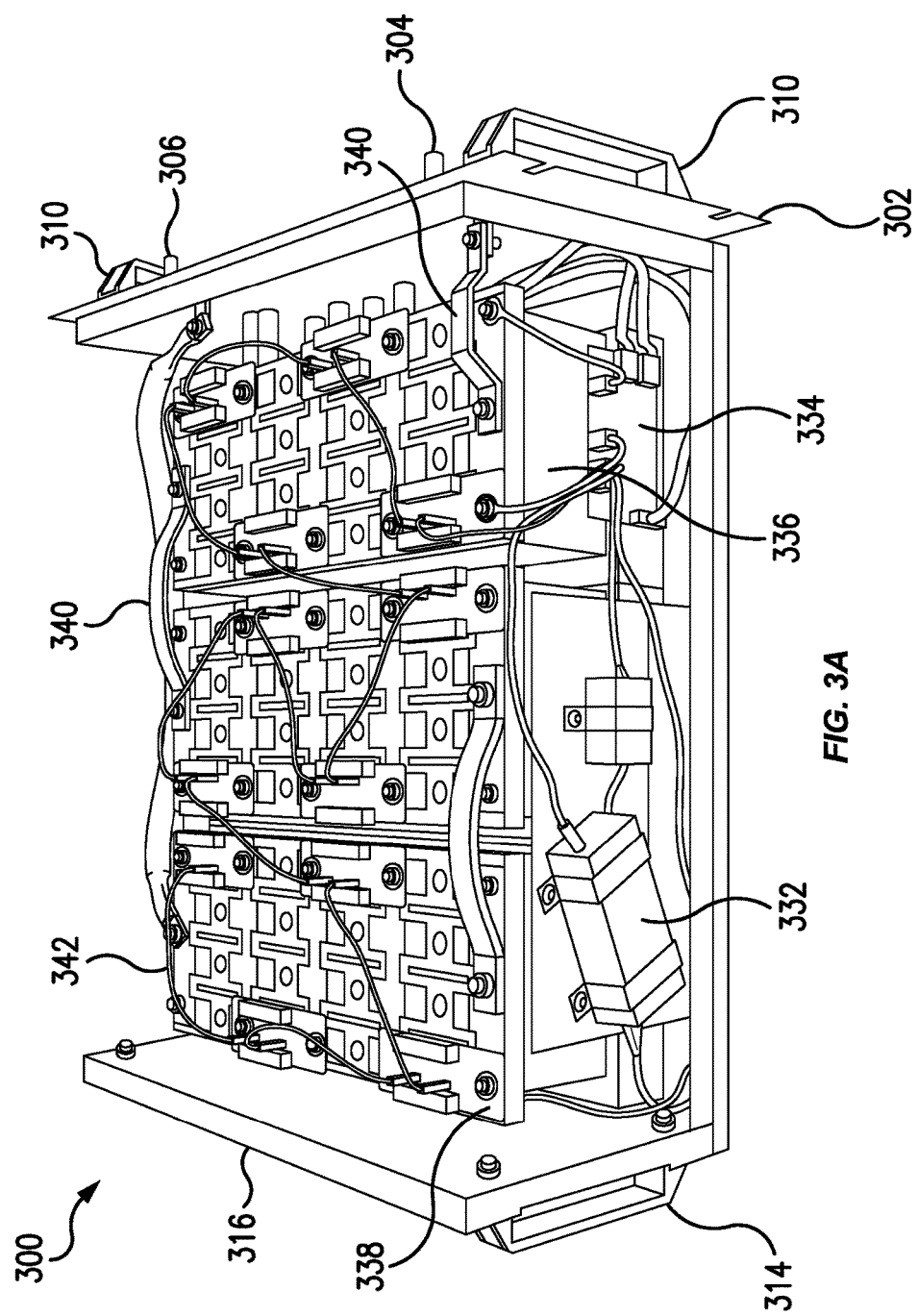
Figure 3B:
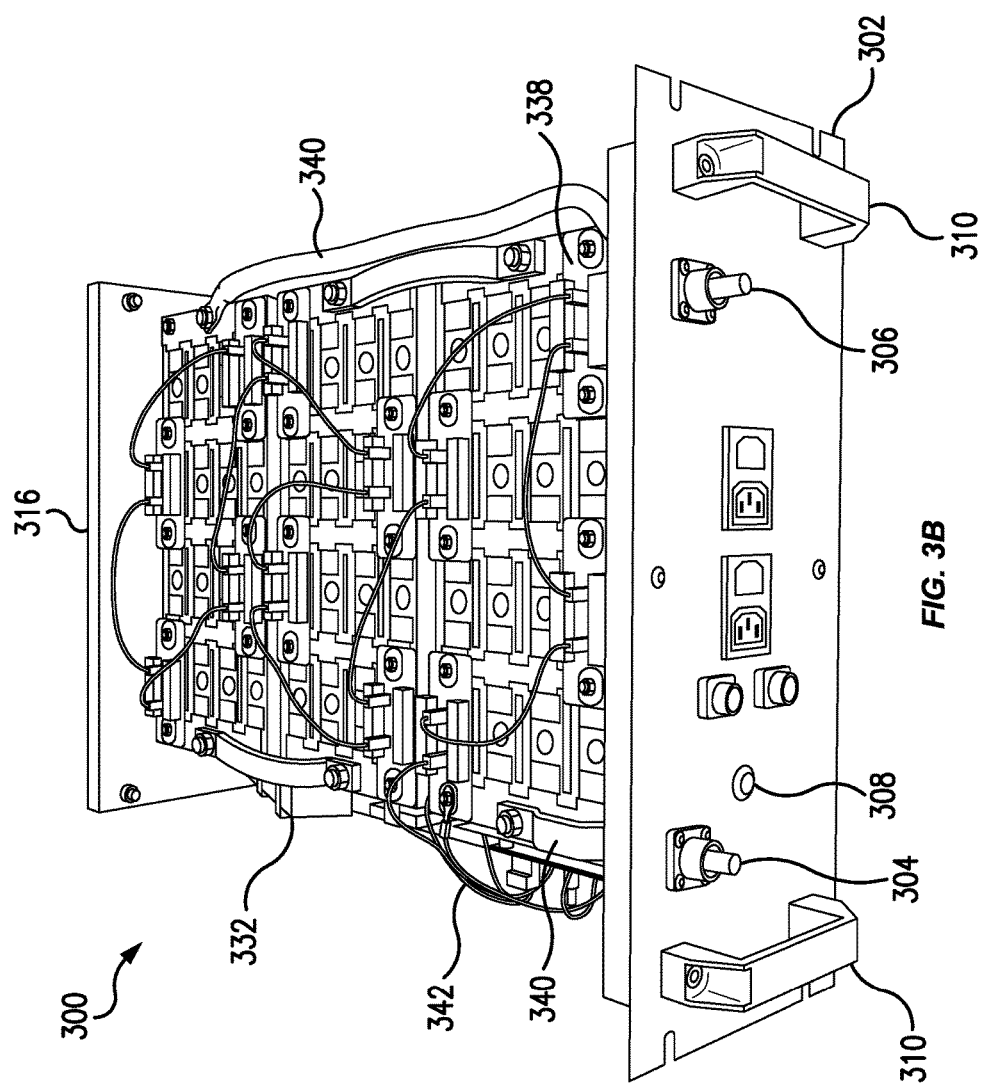
Figure 3C:
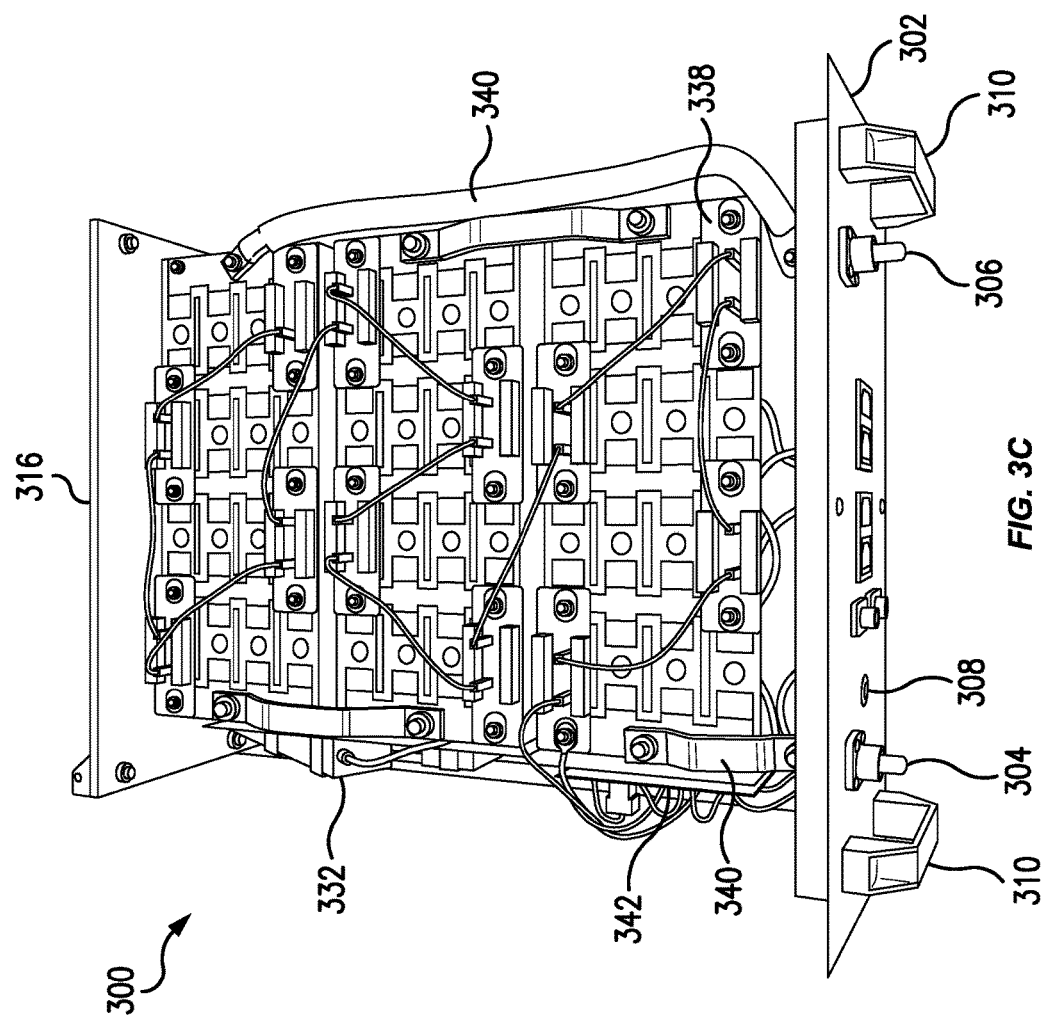
Figure 3E:
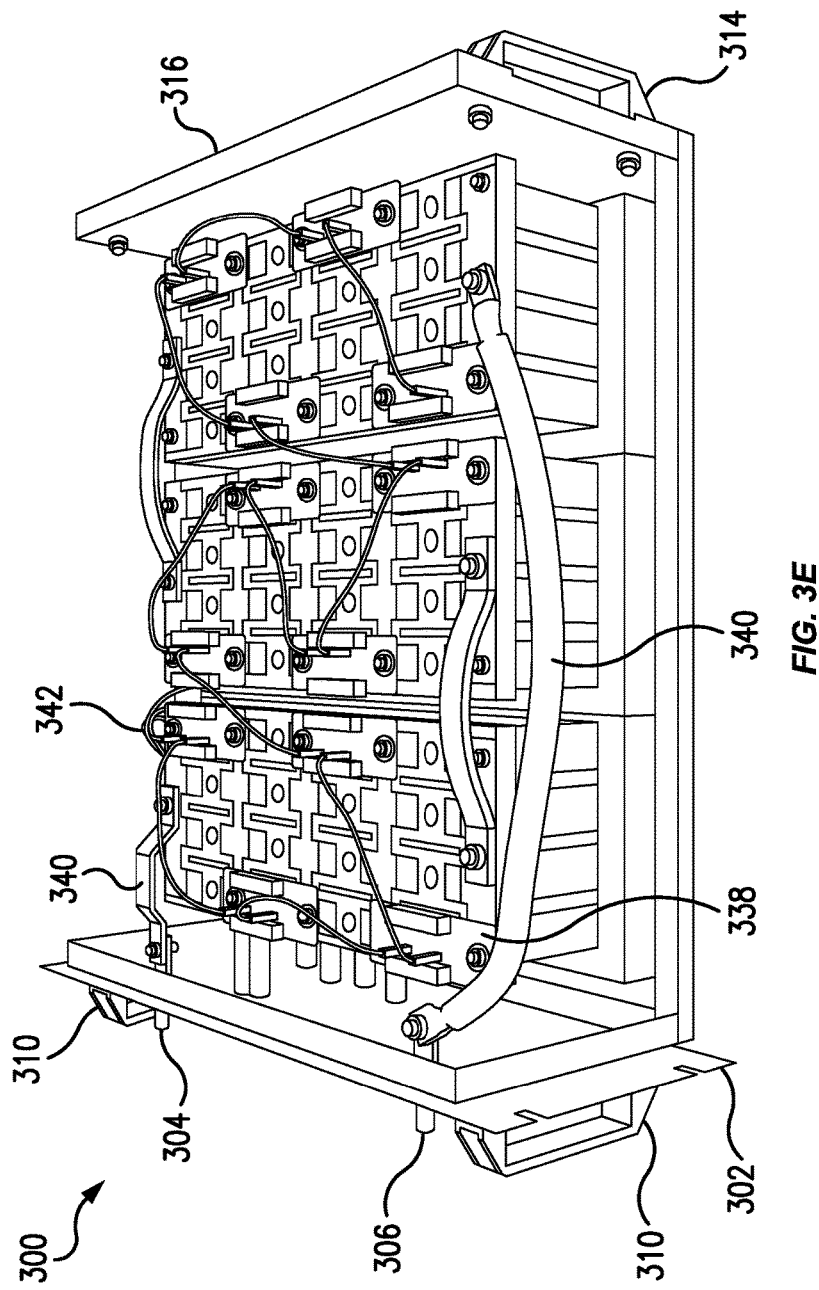
Figure 3F:
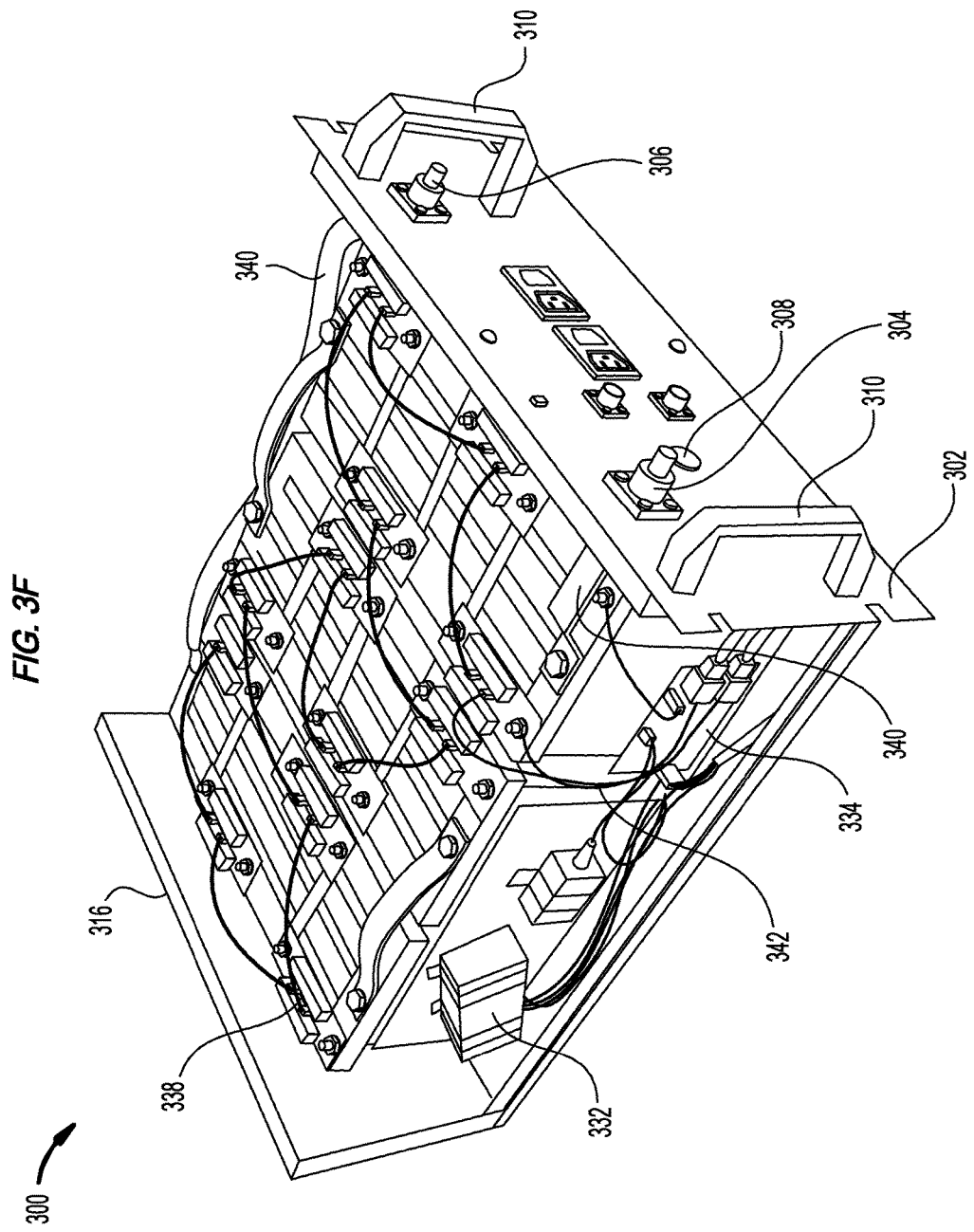
Figure 3G:
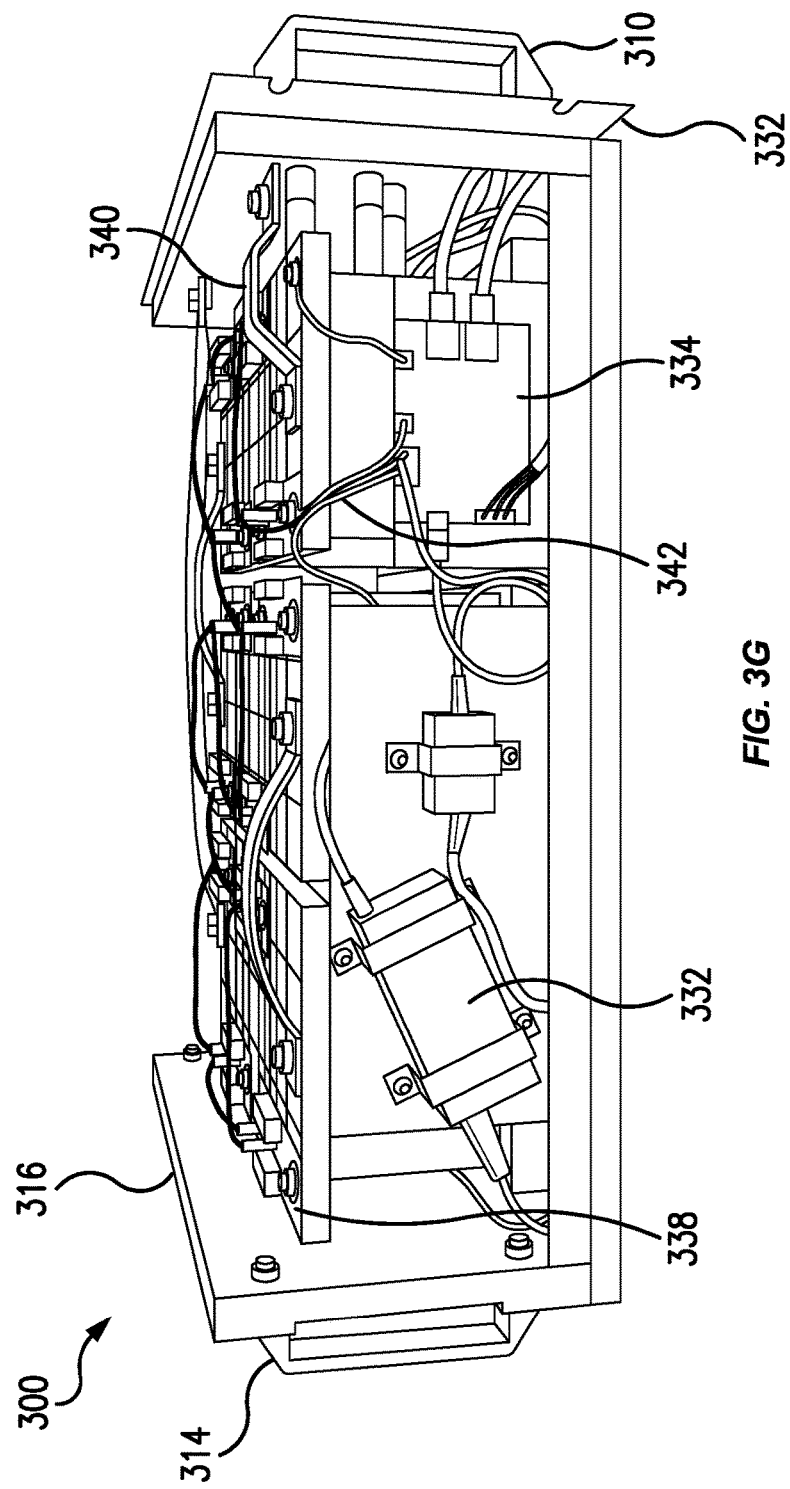
Figure 3H:
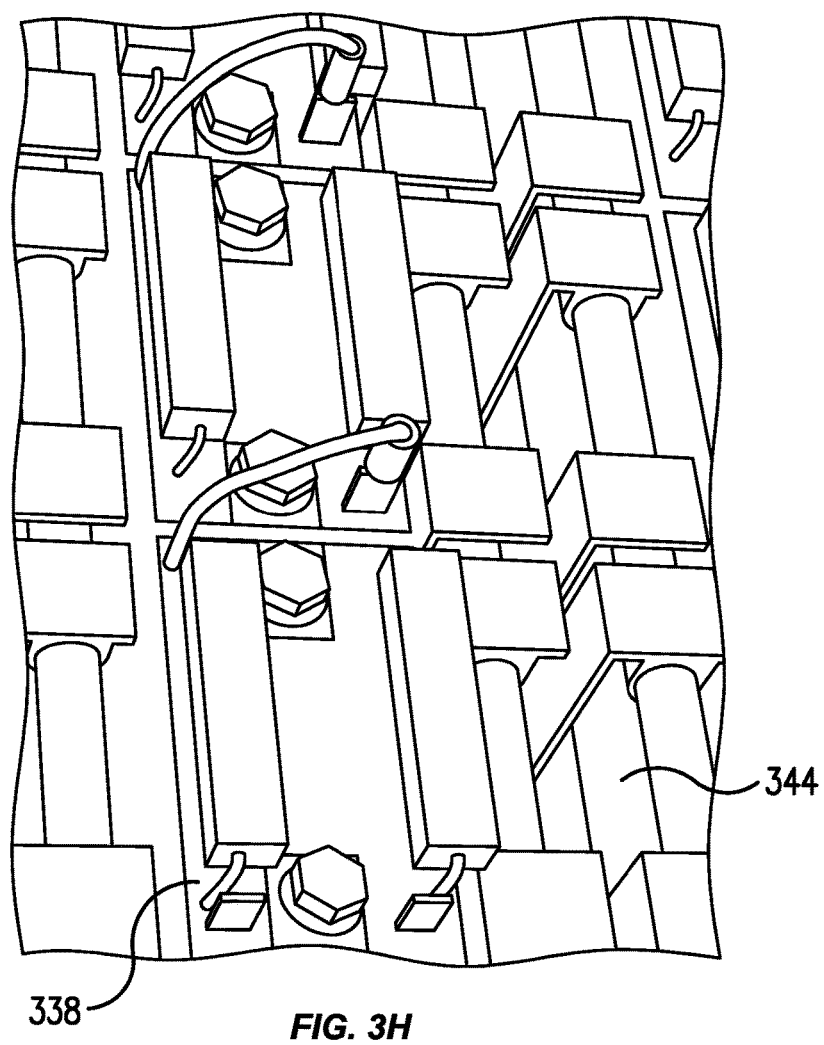

FIGS. 3A, 3B, 3C, 3D, 3E, 3F, 3G, and 3H are diagrams illustrating an example battery pack 300 according to an embodiment of the disclosure. Specifically, FIGS. 3A-G depict example components that are disposed inside the housing of battery pack 300 according to an embodiment. FIGS. 3A, 3E, and 3G depict detailed side views of battery pack 300, FIG. 3B depicts a detailed front view of battery pack 300. FIG. 3C depicts a detailed top view of battery pack 300, FIG. 3D depicts an enlarged top view of battery pack 300, and FIG. 3F depicts a detailed angled view of battery pack 300. Battery pack 300 and its individual components may operate in the same manner as described with respect to battery pack 100 of FIGS. 1A-C.

As described with respect to FIGS. 1A-C, the housing of battery pack 300 may include a front panel 302, a lid or cover (which has been removed in FIGS. 3A-3G), a back panel 316, and a bottom 318. Front panel 302 may include a power connector 304 that may connect to the positive terminal of the battery pack, power connector 306 that may connect to the positive terminal of the battery pack, a status light and reset button 308, and front handles 310. Rear panel 316 may include back handles 314. Battery pack 300 may also include balancing charger 332, battery pack controller 334, and a plurality of battery modules 336. In this embodiment, balancing charger 332 is mounted in battery pack 300 on the left side toward the rear of battery pack 300, and battery pack controller (BPC) 334 is mounted in battery pack 300 on the left side toward the front of battery pack 300. Balancing charger 332 and battery pack controller 334 may be disposed at other locations in battery pack 300 in other embodiments. Power cables 340 may be attached to power connectors 304 and 306 and used to add or remove energy from battery pack 300.

In the embodiment depicted in FIGS. 3A-3G, battery pack 300 includes 12 battery modules, such as battery module 336. As explained above, other embodiments of battery pack 300 may include more or less battery modules. A battery module controller (BMC), such as battery module controller 338, may be mounted on each of the battery modules. As explained above, the BMCs may be daisy-chained together (see for example FIG. 3D) and coupled to BPC 334 (see for example FIGS. 3A, 3F) via communication wire(s) 342 to form a single-wire communication network, an embodiment of which is described in more detail with respect to FIG. 5A. As previously described, each battery module may include a plurality of battery cells, such as 18650 lithium-ion cells 344 of FIG. 3H.

FIG. 4 is a diagram illustrating an example battery pack controller (BPC) 434 integrated into a battery pack 400 according to an embodiment of the invention. Battery pack controller 434 may be connected to communication wire 442 to communicate with the daisy-chained network of battery module controllers that, in this embodiment, are mounted on top of the battery modules of battery pack 400. Battery pack 400 may operate in the same manner as described with respect to battery pack 100 of FIGS. 1A-C and the operation of battery pack controller 434 is described further with respect to FIGS. 5 and 6.

FIG. 5A is a diagram illustrating an example communication network 500 formed by a battery pack controller and a plurality of battery module controllers according to an embodiment of the disclosure. In FIG. 5A, battery pack controller (BPC) 510 is coupled to n battery module controllers (BMCs) 520, 530, 540, 550, and 560. Said another way, n battery module controllers (where n is a whole number greater than or equal to two) are daisy-chained together and coupled to battery pack controller 510 to form communication network 500, which may be referred to as a distributed, daisy-chained battery management system (BMS). Specifically, BPC 510 is coupled to BMC 520 via communication wire 515, BMC 520 is coupled to BMC 530 via communication wire 525, BMC 530 is coupled to BMC 540 via communication wire 535, and BMC 550 is coupled to BMC 560 via communication wire 555 to form the communication network. Each communication wire 515, 525, 535, and 555 may be a single wire, forming a single-wire communication network that allows the BPC 510 to communicate with each of the BMCs 520-560, and vice versa. As would be apparent to one of skill in the art, any number of BMCs may be daisy chained together in communication network 500.

Each BMC in the communication network 500 may have a unique address that BPC 510 uses to communicate with individual BMCs. For example, BMC 520 may have an address of 0002, BMC 530 may have an address of 0003, BMC 540 may have an address of 0004, BMC 350 may have an address of 0005, and BMC 360 may have an address of 0006. BPC 510 may communicate with each of the BMCs by addressing one or more messages to the unique address of any desired BMC. The one or more messages (which include the unique address of the BMC) may include an instruction, for example, to remove energy from a battery module, to stop removing energy from a battery module, to measure and report the temperature of the battery module, and to measure and report the voltage of the battery module. BPC 510 may poll the BMCs to obtain measurements related to the battery modules of the battery pack, such as voltage and temperature measurements. Any polling technique known to one of skill in the art may be used. In some embodiments, BPC 510 continuously polls the BMCs for measurements in order to continuously monitor the voltage and temperature of the battery modules in the battery pack.

For example, BPC 510 may seek to communicate with BMC 540, e.g., in order to obtain temperature and voltage measurements of the battery module that BMC 540 is mounted on. In this example, BPC 510 generates and sends a message (or instruction) addressed to BMC 540 (e.g., address 0004). The other BMCs in the communication network 500 may decode the address of the message sent by BPC 510, but only the BMC (in this example, BMC 540) having the unique address of the message may respond. In this example, BMC 540 receives the message from BPC 510 (e.g., the message traverses communication wires 515, 525, and 535 to reach BMC 540), and generates and sends a response to BPC 510 via the single-wire communication network (e.g., the response traverses communication wires 535, 525, and 515 to reach BPC 510). BPC 510 may receive the response and instruct BMC 540 to perform a function (e.g., remove energy from the battery module it is mounted on). In other embodiments, other types of communication networks (other than communication network 500) may be used, such as, for example, an RS232 or RS485 communication network.

Figure 5B:
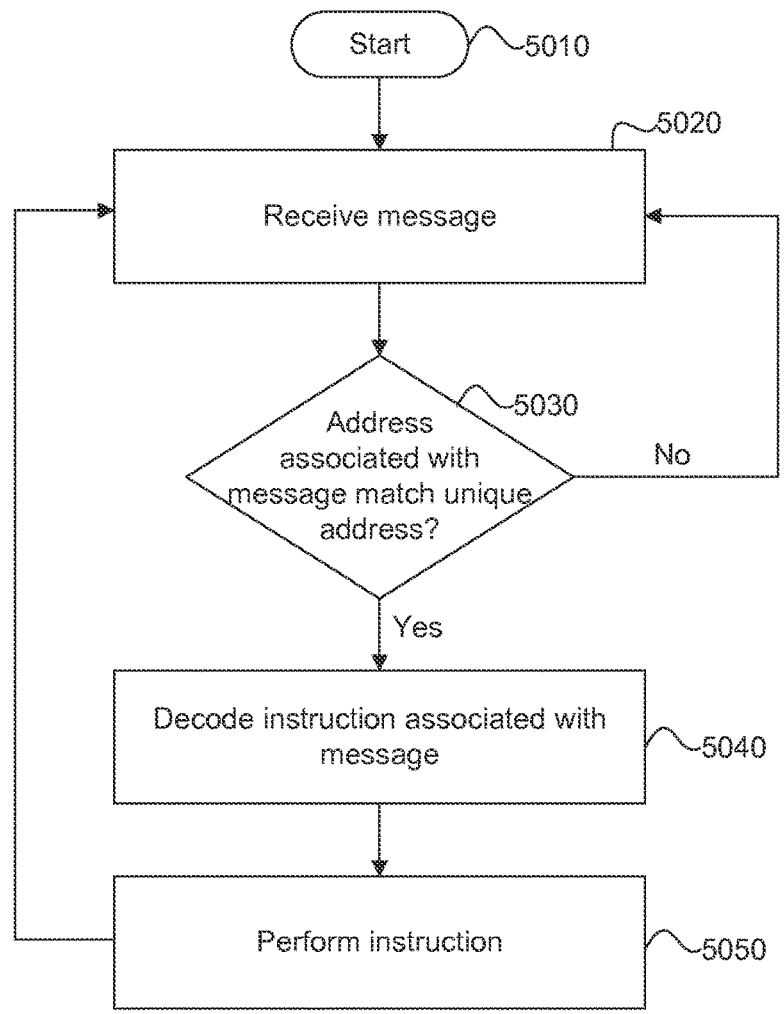
FIG. 5B is a flow diagram illustrating an example method for receiving instructions at a battery module controller.

FIG. 5B is a flow diagram illustrating an example method 5000 for receiving instructions at a battery module controller, such as the battery module controller 138 of FIG. 1C or the battery module controller 520 of FIG. 5A. The battery module controller described with respect to FIG. 5 may be included in a communication network that includes more than one isolated, distributed, daisy-chained battery module controllers, such as the communication network 500 of FIG. 5A.

The method 500 of FIG. 5B may be implemented as software or firmware that is executable by a processor. That is, each stage of the method 5000 may be implemented as one or more computer-readable instructions stored on a non-transient computer-readable storage device, which when executed by a processor causes the processor to perform one or more operations. For example, the method 5000 may be implemented as one or more computer-readable instructions that are stored in and executed by a processor of a battery module controller (e.g., battery pack module controller 138 of FIG. 1C or battery module controller 520 of FIG. 5A) that is mounted on a battery module (e.g., battery module 136 of FIG. 1C) in a battery pack (e.g., battery pack 100 of FIGS. 1A-1C).

As the description of FIG. 5B refers to components of a battery pack, for the sake of clarity, the components enumerated in an example embodiment of battery pack 100 of FIGS. 1A-1C and example communication network 500 of FIG. 5A are used to refer to specific components when describing different stages of the method 5000 of FIG. 5B. However, battery pack 100 of FIGS. 1A-1C and communication network 500 are merely examples, and the method 5000 may be implemented using embodiments of a battery pack other than the example embodiment depicted in FIGS. 1A-1C and a communication network 500 other than the example embodiment depicted in FIG. 5A.

Upon starting (stage 5010), the method 5000 proceeds to stage 5020 where the battery module controller receives a message. For example, a battery pack controller may communicate with the network of daisy-chained battery module controllers (e.g., FIG. 5A) in order to balance the batteries in a battery pack (e.g., battery pack 100 of FIGS. 1A-1C). The message may be received via a communication wire (e.g., communication wire 515 of FIG. 5A) at a communication terminal of the battery module controller. This communication may include (but is not limited to) instructing the network of battery module controllers to provide voltage and/or temperature measurements of the battery modules that they are respectively mounted on, and instructing the battery modules controllers to remove energy from or stop removing energy from the battery modules that they are respectively mounted on.

As discussed with respect to FIG. 5A, each battery module controller (e.g., BMC 520 of FIG. 5A) in a communication network (e.g., communication network 500 of FIG. 5A) may have a unique address that a battery pack controller (e.g., BPC 510 of FIG. 5A) uses to communicate with the battery module controllers. Thus, the message that is received at stage 5020 may include an address of the battery module controller that it is intended for and an instruction to be executed by that battery module controller. At stage 5030, the battery module controller determines whether the address included in the message matches the battery module controller's unique address. If the addresses do not match, the method 5000 returns to stage 5020 and the battery module controller waits for a new message. That is, the battery module controller ignores the instruction associated with the message in response to determining that the address associated with the message does not match the unique address of the battery module controller. If the addresses do match, the method 5000 advances to stage 5040.

In stage 5040, the battery module controller decodes the instruction that is included in the message and the method 5000 advances to stage 5050. In stage 5050, the battery module controller performs the instruction. Again, the instruction may be (but is not limited to) measure and report the temperature of the battery module, measure and report the voltage of the battery module, remove energy from the battery module (e.g., apply one or more shunt resistors across the terminals of the battery module), stop removing energy from the battery module (e.g., stop applying the one or more shunt resistors across the terminals of the battery module), or calibrate voltage measurements before measuring the voltage of the battery module. In various embodiments, temperature and voltage measurements may be sent as actual temperature and voltage values, or as encoded data that may be decoded after reporting the measurement. After stage 5050, the method 5000 loops back to stage 5020 and the battery module controller waits for a new message.

Figure 6:
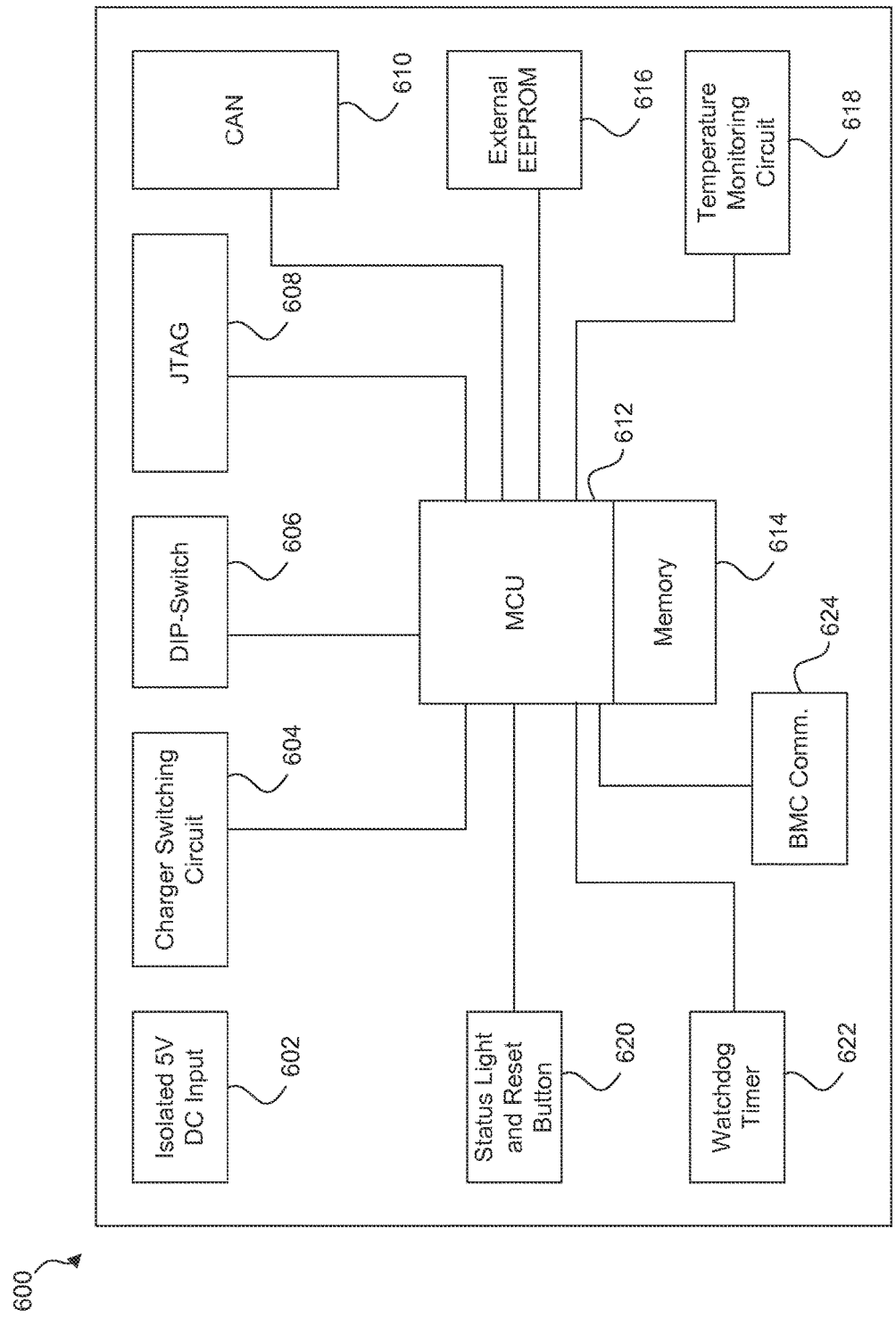
FIG. 6 is a diagram illustrating an example battery pack controller.

FIG. 6 is a diagram illustrating an example battery pack controller 600 according to an embodiment of the disclosure. Battery pack controller 134 of FIG. 1C may be implemented as described in accordance with battery pack controller 600 of FIG. 6. Battery pack controller 510 of FIG. 5A may be implemented as described in accordance with battery pack controller 600 of FIG. 6.

As shown in FIG. 6, the example battery pack controller 600 includes a DC input 602 (which may be an isolated 5V DC input), a charger switching circuit 604, a DIP-switch 606, a JTAG connection 608, a CAN (CANBus) connection 610, a microprocessor unit (MCU) 612, memory 614, an external EEPROM 616, a temperature monitoring circuit 618, a status light and reset button 620, a watchdog timer 622, and a battery module controller (BMC) communication connection 624.

In one embodiment, battery pack controller 600 may be powered from energy stored in the battery cells. Battery pack controller 600 may be connected to the battery cells by DC input 602. In other embodiments, battery pack controller 600 may be powered from an AC to DC power supply connected to DC input 602. In these embodiments, a DC-DC power supply may then convert the input DC power to one or more power levels appropriate for operating the various electrical components of battery pack controller 600.

In the example embodiment illustrated in FIG. 6, charger switching circuit 604 is coupled to MCU 612. Charger switching circuit 604 and MCU 612 may be used to control operation of a balancing charger, such as balancing charger 132 of FIG. 1C. As described above, a balancing charger may add energy to the battery cells of the battery pack. In an embodiment, temperature monitoring circuit 618 includes one or more temperature sensors that can monitor the temperature heat sources within the battery pack, such as the temperature of the balancing charger that is used to add energy to the battery cells of the battery pack.

Battery pack controller 600 may also include several interfaces and/or connectors for communicating. These interfaces and/or connectors may be coupled to MCU 612 as shown in FIG. 6. In one embodiment, these interfaces and/or connectors include: DIP-switch 606, which may be used to set a portion of software bits used to identify battery pack controller 600; JTAG connection 608, which may be used for testing and debugging battery pack controller 600; CAN (CANBus) connection 610, which may be used to communicate with a controller that is outside of the battery pack; and BMC communication connection 624, which may be used to communicate with one or more battery module controllers, such as a distributed, daisy-chained network of battery module controllers (e.g., FIG. 5A). For example, battery pack controller 600 may be coupled to a communication wire, e.g., communication wire 515 of FIG. 5A, via BMC communication connection 624.

Battery pack controller 600 also includes an external EEPROM 616. External EEPROM 616 may store values, measurements, etc., for the battery pack. These values, measurements, etc., may persist when power of the battery pack is turned off (i.e., will not be lost due to loss of power). External EEPROM 616 may also store executable code or instructions, such as executable code or instructions to operate microprocessor unit 612.

Microprocessor unit (MCU) 612 is coupled to memory 614. MCU 612 is used to execute an application program that manages the battery pack. As described herein, in an embodiment the application program may perform the following functions (but is not limited thereto): monitor the voltage and temperature of the battery cells of battery pack 100, balance the battery cells of battery pack 100, monitor and control (if needed) the temperature of battery pack 100, handle communications between the battery pack and other components of an electrical energy storage system (see FIG. 9 below), and generate warnings and/or alarms, as well as take other appropriate actions, to protect the battery cells of battery pack 100.

As described above, a battery pack controller may obtain temperature and voltage measurements from battery module controllers. The temperature readings may be used to ensure that the battery cells are operated within their specified temperature limits and to adjust temperature related values calculated and/or used by the application program executing on MCU 612. Similarly, the voltage readings are used, for example, to ensure that the battery cells are operated within their specified voltage limits.

Watchdog timer 622 is used to monitor and ensure the proper operation of battery pack controller 600. In the event that an unrecoverable error or unintended infinite software loop should occur during operation of battery pack controller 600, watchdog timer 622 can reset battery pack controller 600 so that it resumes operating normally. Status light and reset button 620 may be used to manually reset operation of battery pack controller 600. As shown in FIG. 6, status light and reset button 620 and watchdog timer 622 may be coupled to MCU 612.

FIGS. 7A and 7B are diagrams illustrating an example battery module controller 700 according to an embodiment of the disclosure. Specifically, FIG. 7A depicts a top view of battery module controller 700 and FIG. 7B depicts a bottom view of battery module controller 700. Battery module controller 700 may be coupled to a battery module, such as a battery module 136 of FIG. 1C, and may include shunt resistors 735, temperature sensor 750, positive terminal 760, negative terminal 765, and communication terminals 770. Shunt resistors 735 may be used to discharge energy from the battery module it is mounted on, and battery module controller 700 may communicate with other components of a battery pack (e.g., a battery pack controller, such as battery controller 134 of FIG. 1C) via a communication wire, such as communication wire 515 of FIG. 5A, coupled to communication terminals 770. Temperature sensor 750 may measure the temperature of the battery module coupled to battery module controller 700. The operation of battery module controller 700 is further described below with respect to FIG. 8.

Figure 8:
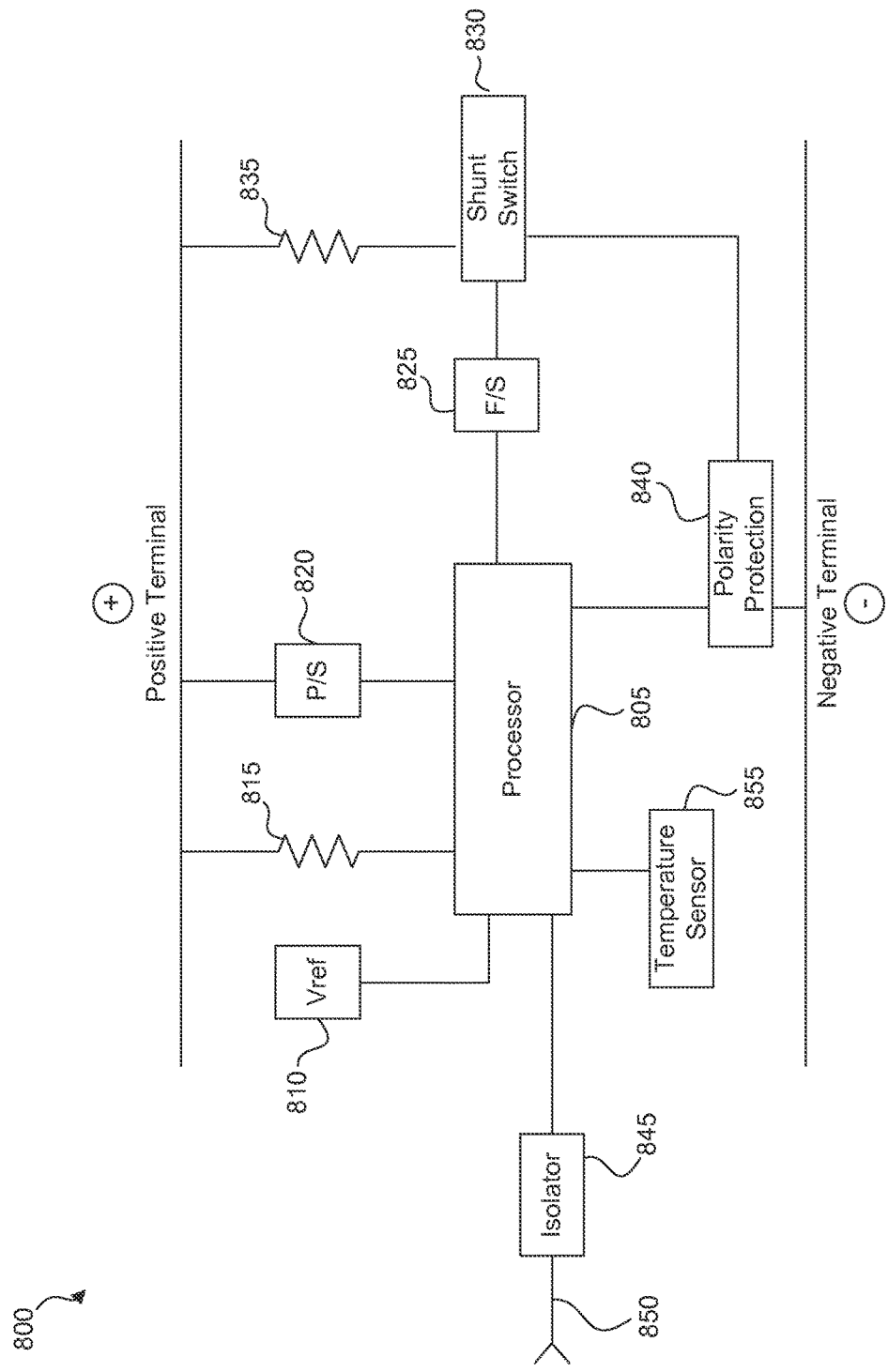
FIG. 8 is a diagram further illustrating an example battery module controller.

FIG. 8 is a diagram illustrating an example battery module controller 800 according to an embodiment of the disclosure. Battery module controller 138 of FIG. 1C may be implemented as described in accordance with battery module controller 800 of FIG. 8. Each of battery module controllers 520, 530, 540, 550, and 560 of FIG. 5A may be implemented as described in accordance with battery module controller 800 of FIG. 8. Battery module controller 800 may be mounted on a battery module of a battery pack and may perform the following functions (but is not limited thereto): measure the voltage of the battery module, measure the temperature of the battery module, and remove energy from (discharge) the battery module.

In FIG. 8, the battery module controller 800 includes processor 805, voltage reference 810, one or more voltage test resistors 815, power supply 820, fail safe circuit 825, shunt switch 830, one or more shunt resistors 835, polarity protection circuit 840, isolation circuit 845, and communication wire 850. Processor 805 controls the battery module controller 800. Processor 805 receives power from the battery module that battery module controller 800 is mounted on via the power supply 820. Power supply 820 may be a DC power supply. As shown in FIG. 8, power supply 820 is coupled to the positive terminal of the battery module, and provides power to processor 805. Processor 805 is also coupled to the negative terminal of the battery module via polarity protection circuit 840, which protects battery module controller 800 in the event that it is improperly mounted on a battery module (e.g., the components of battery module controller 800 that are coupled to the positive terminal in FIG. 8 are improperly coupled to the negative terminal and vice versa).

Battery module controller 800 may communicate with other components of a battery pack (e.g., a battery pack controller, such as battery pack controller 134 of FIG. 1C) via communication wire 850, which may be a single wire. As described with respect to the example communication network of FIG. 5A, communication wire 850 may be used to daisy chain battery module controller 800 to a battery pack controller and/or one or more other battery module controllers to form a communication network. Communication wire 850 may be coupled to battery pack controller 800 via a communication terminal disposed on battery pack controller 800. As such, battery module controller 800 may send and receive messages (including instructions sent from a battery pack controller) via communication wire 850. When functioning as part of a communication network, battery module controller 800 may be assigned a unique network address, which may be stored in a memory device of the processor 805.

Battery module controller 800 may be electrically isolated from other components that are coupled to the communication wire (e.g., battery pack controller, other battery module controllers, computing systems external to the battery pack) via isolation circuit 845. In the embodiment illustrated in FIG. 8, isolation circuit 845 is disposed between communication wire 850 and processor 805. Again, communication wire 850 may be coupled to battery pack controller 800 via a communication terminal disposed on battery pack controller 800. This communication terminal may be disposed between communication wire 850 and isolation circuit 845, or may be part of isolation circuit 845. Isolation circuit 845 may capacitively couple processor 805 to communication wire 850, or may provide other forms of electrical isolation known to those of skill in the art.

As explained above, battery module controller 800 may measure the voltage of the battery module it is mounted on. As shown in FIG. 8, processor 805 is coupled to voltage test resistor 815, which is coupled to the positive terminal of the battery module. Processor 805 may measure the voltage across voltage test resistor 815, and compare this measured voltage to voltage reference 810 to determine the voltage of the battery module. As described with respect to FIG. 5A, battery module controller 800 may be instructed to measure the voltage of the battery module by a battery pack controller. After performing the voltage measurement, processor 805 may report the voltage measurement to a battery pack controller via communication wire 850.

Battery module controller 800 may also remove energy from the battery module that it is mounted on. As shown in FIG. 8, processor 805 is coupled to fail safe circuit 825, which is coupled to shunt switch 830. Shunt switch 830 is also coupled to the negative terminal via polarity protection circuit 840. Shunt resistor 835 is disposed between the positive terminal of the battery module and shunt switch 830. In this embodiment, when shunt switch 830 is open, shunt resistor 835 is not applied across the positive and negative terminals of the battery module; and when shunt switch 830 is closed, shunt resistor 835 is applied across the positive and negative terminals of the battery module in order to remove energy from the battery module. Processor 805 may instruct shunt switch 830 to selectively apply shunt resistor 835 across the positive and negative terminals of the battery module in order to remove energy from the battery module. In one embodiment, processor 805 instructs shunt switch 830 at regular intervals (e.g., once every 30 seconds) to apply shunt resistor 835 in order to continuously discharge the battery module.

Fail safe circuit 825 may prevent shunt switch 830 from removing too much energy from the battery module. In the event that processor 805 malfunctions, fail safe circuit 825 may instruct shunt switch 830 to stop applying shunt resistor 835 across the positive and negative terminals of the battery module. For example, processor 805 may instruct shunt switch 830 at regular intervals (e.g., once every 30 seconds) to apply shunt resistor 835 in order to continuously discharge the battery module. Fail safe circuit 825, which is disposed between processor 805 and shunt switch 830, may monitor the instructions processor 805 sends to shunt switch 830. In the event that processor 805 fails to send a scheduled instruction to the shunt switch 830 (which may be caused by a malfunction of processor 805), fails safe circuit 825 may instruct or cause shunt switch 830 to open, preventing further discharge of the battery module. Processor 805 may instruct fait safe circuit 825 to prevent shunt switch 830 from discharging the battery module below a threshold voltage or state-of-charge level, which may be stored or calculated in battery module controller 800 or in an external controller (e.g., a battery pack controller).

Battery module controller 800 of FIG. 8 also includes temperature sensor 855, which may measure the temperature of the battery module that battery module controller 800 is connected to. As depicted in FIG. 8, temperature sensor 855 is coupled to processor 805, and may provide temperature measurements to processor 805. Any temperature sensor known to those skilled in the art may be used to implement temperature sensor 855.

Figure 9:
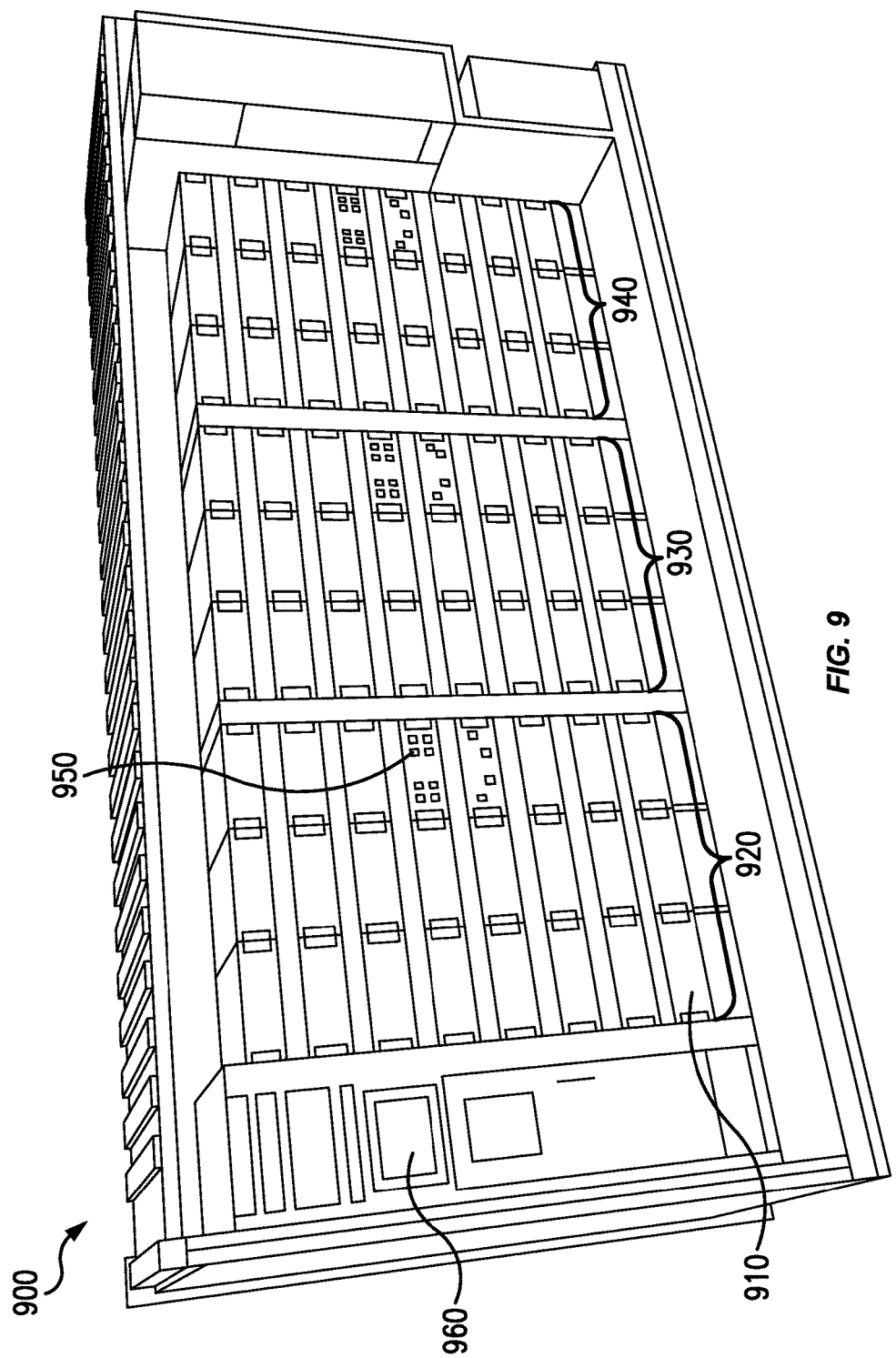
FIG. 9 is a diagram illustrating an example battery energy storage system.

FIG. 9 is a diagram illustrating an example battery energy storage system 900 according to an embodiment of the disclosure. Battery energy storage system 900 can be operated as a stand-alone system, or it can be combined together with other battery energy storage systems to form a part of a larger battery energy storage system. Battery energy storage system 900 may be highly scalable, ranging from a small kilowatt-hour size battery energy storage system to a megawatt-hour size battery energy storage system. In the embodiment illustrated in FIG. 9, battery energy storage system 900 is housed in a container (similar to a shipping container) and is movable (e.g., transported by a truck). Other housings known to those skilled in the art are within the scope of this disclosure.

As shown in FIG. 9, battery energy storage system 900 includes a plurality of battery packs, such as battery pack 910. Battery pack 910 may be implemented as described with respect to FIGS. 1-8 above. As explained above, each battery pack includes battery cells (which may be arranged into battery modules), a battery pack controller that monitors the battery cells, a balancing charger (e.g., DC power supply) that adds energy to each of the battery cells, and a distributed, daisy-chained network of battery module controllers that may take certain measurements of and remove energy from the battery cells. As explained, the battery pack controller may control the network of battery module controllers and the balancing charger to control the state-of-charge or voltage of a battery pack.

The battery packs of battery energy storage system 900 may be mounted on racks. A plurality of battery packs may be connected in series, which may be referred to as a string of battery packs or a battery pack string. For example, battery pack 910 may be connected in series with other battery packs to form battery pack string 920. FIG. 9 illustrates three battery pack strings 920, 930, and 940. A plurality of battery pack strings may be connected in parallel to form a battery energy storage system.

Each battery pack string may be controlled by a controller, which may be referred to as a string controller. For example, battery pack string 920 may be controlled by string controller 950. As its name suggests, a string controller may monitor and control the battery packs of a string. In an embodiment, the plurality of string controllers may be linked together using CAN (CANBus) communications, which enables the string controllers to operate together as part of an overall network of battery string controllers. This network of battery string controllers can manage and operate any size battery system such as, for example, a multi-megawatt-hour centralized battery energy storage system. In an embodiment, one of the networked battery string controllers (such as battery string controller 950) can be designated as a master battery string controller and used to control battery charge and discharge operations by sending commands that operate one or more inverters and/or chargers connected to the battery system. Alternatively, a computer or system controller 960 may be coupled to and control the string controllers in a battery energy storage system. A string controller may communicate with the battery pack controller in each of the battery packs in its string (e.g., string controller 950 may communicate with the BPC in battery pack 910) to monitor and control charging and discharging of the battery packs. In one embodiment, a string controller sends each battery pack in its string a target voltage, and the battery packs adjust the battery cells to the target voltage. A string controller and BPC may also communicate measurements (e.g., voltage, temperature, current values), and perform diagnostic procedures, startup procedures, and the like.

In an embodiment battery energy storage system 900 includes or is otherwise coupled to a bi-directional power converter. The bi-directional power converter may charge and discharge battery packs using commands issued, for example, via a computer over a network (e.g. the Internet, an Ethernet, etc.). In one embodiment, an operator at a utility may use a networked computer to control battery energy storage system 900. Both the real power and the reactive power of the bi-directional power converter may be controlled. Also, in some embodiments, the bi-directional power converter can be operated as a backup power source when grid power is not available and/or the battery energy storage unit is disconnected from the power grid.

Battery energy storage system 900 may be used as a part of a renewable wind energy system, which includes wind turbines. Energy from the wind turbines may be stored in and selectively discharged from battery energy storage system 900. Similarly, battery energy storage system 900 may be used as a part of a renewable solar energy system, which includes a solar array. Energy from the solar array may be stored in and selectively discharged from the battery energy storage system 900. Additionally, battery energy storage system 900 may be used as a part of a grid energy system (power grid), which includes electrical equipment. Energy from grid energy system may be stored in and selectively discharged from battery energy storage system 900.

Figure 10:
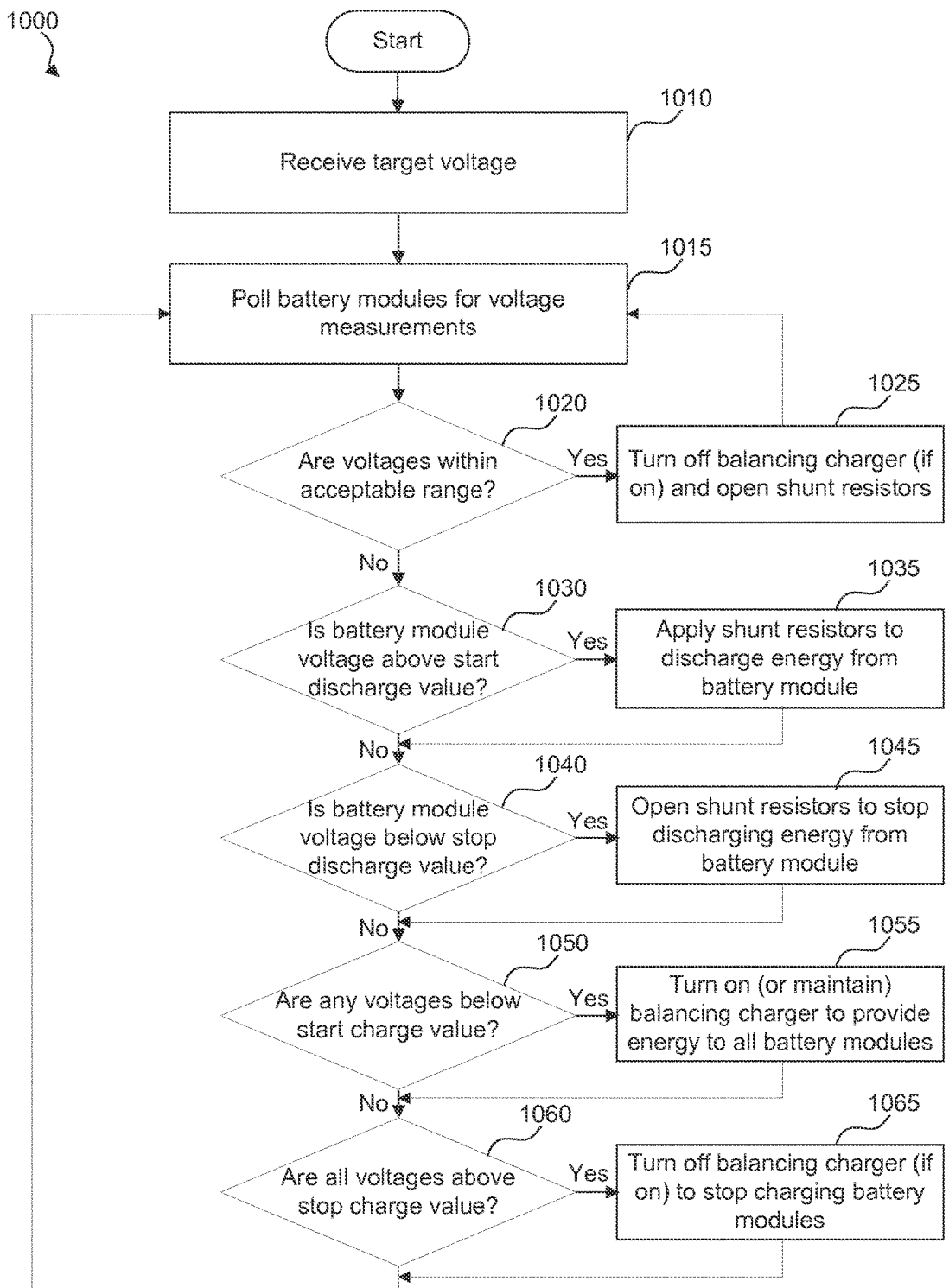
FIG. 10 is a flow diagram illustrating an example method for balancing a battery pack.

FIG. 10 is a flow diagram illustrating an example method 1000 for balancing a battery pack, such as battery pack 100 of FIGS. 1A-1C that includes a plurality of battery modules, a balancing charger, a battery pack controller, and a network of isolated, distributed, daisy-chained battery module controllers. The method 1000 may be implemented as software or firmware that is executable by a processor. That is, each stage of the method 1000 may be implemented as one or more computer-readable instructions stored on a non-transient computer-readable storage device, which when executed by a processor causes the processor to perform one or more operations. For example, the method 1000 may be implemented as one or more computer-readable instructions that are stored in and executed by a battery pack controller (e.g., battery pack controller 134 of FIG. 1C) in a battery pack (e.g., battery pack 100 of FIGS. 1A-1C).

As the description of FIG. 10 refers to components of a battery pack, for the sake of clarity, the components enumerated in an example embodiment of battery pack 100 of FIGS. 1A-1C are used to refer to specific components when describing different stages of the method 1000 of FIG. 10. However, battery pack 100 of FIGS. 1A-1C is merely an example, and the method 1000 may be implemented using embodiments of a battery pack other than the exemplary embodiment depicted in FIGS. 1A-1C.

Upon starting, the method 1000 proceeds to stage 1010 where a target voltage value is received by a battery pack controller, such as battery pack controller 134. The target value may be used to balance the voltage and/or state of charge of each battery module (e.g., battery module 136) in the battery pack and may be received from an external controller, such as a string controller described with respect to FIG. 9. In stage 1015, the battery modules are polled for voltage measurements. For example, battery pack controller 134 may request a voltage measurement from each of the battery modules controllers (e.g., battery module controller 138) that are mounted on the battery modules. Again, one battery module controller may be mounted on each of the battery modules. Each battery module controller may measure the voltage of the battery module that it is mounted on, and communicate the measured voltage to the battery pack controller 134. And, as discussed with respect to FIG. 5A, a battery pack controller and a plurality of isolated, distributed, daisy-chained battery module controllers may be coupled together to form a communication network. Polling may be performed sequentially (e.g., poll BMC 520, followed by BMC 530, followed by BMC 540, and so on). In an embodiment, a target state of charge value may be received at stage 1010 instead of a target voltage value. This target state of charge may then be compared to polled voltage values by estimating or calculating a state of charge based on each polled voltage value.

In stage 1020, a determination is made as to whether each polled battery module voltage is in an acceptable range. This acceptable range may be determined by one or more threshold voltage values above and/or below the received target voltage. For example, battery pack controller 134 may use a start discharge value, a stop discharge value, a start charge value, and a stop charge value that are used to determine whether balancing of battery modules should be performed. In an embodiment, the start discharge value may be greater than the stop discharge value (both of which may be greater than the target value), and the start charge value may be less than the stop charge value (both of which may be less than the target value). These threshold values may be stored as absolute values or derived by adding stored offset values to the received target voltage value. In an embodiment, the acceptable range may lie between the start discharge value and the start charge value, indicating a range in which no balancing may be necessary. If all battery module voltages are within the acceptable range, method 1000 proceeds to stage 1025. In stage 1025, a balancing charger (e.g., balancing charger 132) is turned off (if on) and shunt resistors of each battery module controller 138 that have been applied, such as shunt resistors 735 of FIG. 7A, are opened to stop removing energy from the battery module. For example, battery pack controller 134 may instruct balancing charger 132 to stop providing energy to the battery modules of battery pack 1000. Battery pack controller 134 may also instruct each battery module controller that is applying a shunt resistor to the battery module it is mounted on to stop applying the shunt resistor, and thus stop removing energy from the battery module. Method 1000 then returns to step 1015 where the battery modules of the battery pack are again polled for voltage values.

Returning to stage 1020, if all battery module voltages are not within the acceptable range, the method proceeds to stage 1030. In stage 1030, for each battery module, it is determined whether the battery module voltage is above the start discharge value. If the voltage is above the start discharge value, method 1000 proceeds to stage 1035 where shunt resistors of the battery module controller (e.g., battery module controller 138) coupled to the battery module are applied in order to remove (discharge) energy from the battery module. The method then continues to stage 1040.

In stage 1040, for each battery module, it is determined whether the battery module voltage is below the stop discharge value. If the voltage is below the stop discharge value, method 1000 proceeds to stage 1045 where shunt resistors of the battery module controller (e.g., battery module controller 138) coupled to the battery module are opened in order to stop discharging energy from the battery module. That is, the battery module controller stops applying the shunt resistor(s) across the terminals of the battery module it is mounted on. This prevents the battery module controller from removing energy from the battery module. The method then continues to stage 1050.

In stage 1050, it is determined whether at least one battery module voltage is below the start charge value. If any voltage is below the start charge value, method 1000 proceeds to stage 1055 where a balancing charger is turned on to provide energy to all of the battery modules. For example, battery pack controller 134 may instruct balancing charger 132 to turn on, providing energy to each of the battery modules in the battery pack 100. Method 1000 then continues to stage 1060.

In stage 1060, it is determined whether all battery module voltages are above the stop charge value. If all voltages are above the stop charge value, method 1000 proceeds to stage 1065 where a balancing charger is turned off (if previously on) to stop charging the battery modules of the battery pack. For example, battery pack controller 134 may instruct balancing charger 132 to stop providing energy to the battery modules of battery pack 100. Method 1000 then returns to stage 1015 where the battery modules are again polled for voltage measurements. Thus, as previously described, stages 1015 to 1060 of method 1000 may be continuously balance the energy of the battery modules within a battery pack, such as battery pack 100.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. Also, Identifiers, such as "(a)," "(b)," "(i)," "(ii)," etc., are sometimes used for different elements or steps. These identifiers are used for clarity and do not necessarily designate an order for the elements or steps.

The foregoing description of specific embodiments will so fully reveal the general nature of the inventions that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described embodiments, but should be defined only in accordance with the following claims and their equivalents.

What is claimed is:

1. A battery pack comprising:
   a plurality of battery modules;
   a balancing charger configured to add energy to the plurality of battery modules; and
   a battery pack controller coupled to a plurality of daisy-chained battery module controllers to form a communication network,
   wherein each of the plurality of daisy-chained battery module controllers is mounted on one of the plurality of battery modules and is configured to remove energy from the battery module it is mounted on, and wherein each of the plurality of daisy-chained battery module controllers comprises:
   a first terminal coupled to a positive terminal of the battery module that the battery module controller is mounted on;
   a second terminal coupled to a negative terminal of the battery module that the battery module controller is mounted on; and
   a shunt resistor configured to be selectively applied across the first and second terminals to discharge energy of the battery module that the battery module controller is mounted on.

2. The battery pack of claim 1, wherein each of the plurality of daisy-chained battery module controllers further comprises a processor that is configured to measure a voltage of the battery module it is mounted on, and report the measured voltage to the battery pack controller.

3. The battery pack of claim 1, wherein each of the plurality of daisy-chained battery module controllers further comprises a processor that is configured to measure a temperature of the battery module it is mounted on, and report the measured temperature to the battery pack controller.

4. The battery pack of claim 1, wherein each of the plurality of daisy-chained battery module controllers further comprises:
   a polarity protection circuit configured to protect the battery module controller in response to the first and second terminals being coupled to the negative and positive terminals of the battery module, respectively.

5. The battery pack of claim 1, wherein each of the plurality of daisy-chained battery module controllers further comprises:
   a fail-safe circuit configured to prevent the shunt resistor from discharging the battery module that the battery module controller is mounted on below a threshold energy level.

6. The battery pack of claim 1, wherein each of the plurality of daisy-chained battery module controllers further comprises:
   an isolation circuit configured to electrically isolate the battery module controller from the other components coupled to the battery module controller.

7. The battery pack of claim 1, wherein each of the plurality of battery modules comprises a plurality of battery cells.

8. The battery pack of claim 7, wherein the plurality of battery cells are cylindrical cells, prismatic cells, or pouch cells.

9. The battery pack of claim 8, wherein the plurality of battery cells are 18650 lithium-ion cells.

10. A battery pack comprising:
    a plurality of battery modules;
    a balancing charger configured to add energy to the plurality of battery modules; and
    a battery pack controller coupled to a plurality of daisy-chained battery module controllers to form a communication network, wherein each of the plurality of daisy-chained battery module controllers is mounted on one of the plurality of battery modules and comprises:
- a shunt resistor configured to discharge energy from the battery module that it is mounted on;
- a processor configured to instruct the shunt resistor to discharge energy from the battery module that it is mounted on; and
- a communication terminal configured to receive an instruction from the battery pack controller to discharge energy from the battery module that it is mounted on.

11. The battery pack of claim 10, wherein each of the plurality of daisy-chained battery module controllers comprises a unique address in the communication network.

12. The battery pack of claim 11, wherein each of the plurality of daisy-chained battery module controllers is configured to receive the message from the battery pack controller and to determine whether the message comprises its unique address.

13. The battery pack of claim 9, wherein the battery pack controller is configured to poll the plurality of daisy-chained battery module controllers for a voltage measurement and a temperature measurement of the battery module that the battery module controller is mounted on.

14. The battery pack of claim 13, wherein each of the plurality of battery module controllers is configured to measure a voltage and a temperature of the battery module it is mounted on, and to report the measured voltage and the measured temperature to the battery pack controller.

15. The battery pack of claim 10, wherein each of the plurality of daisy-chained battery module controllers further comprises:
- an isolation circuit configured to electrically isolate the battery module controller from the other components coupled to the battery module controller.

16. The battery pack of claim 10, wherein each of the plurality of daisy-chained battery module controllers further comprises:
- a fail-safe circuit disposed between the processor and the shunt switch and configured to prevent the shunt resistor from discharging the battery module that the battery module controller is mounted on below a threshold energy level.

17. The battery pack of claim 10, wherein each of the plurality of battery modules comprises a plurality of battery cells.

18. The battery pack of claim 17, wherein the plurality of battery cells are cylindrical cells, prismatic cells, or pouch cells.

19. The battery pack of claim 17, wherein the plurality of battery cells are 18650 lithium-ion cells.

* * * * *